(12) United States Patent
Walton et al.

(10) Patent No.: US 7,042,856 B2
(45) Date of Patent: May 9, 2006

(54) METHOD AND APPARATUS FOR CONTROLLING UPLINK TRANSMISSIONS OF A WIRELESS COMMUNICATION SYSTEM

(75) Inventors: J. Rodney Walton, Carlisle, MA (US); Mark S. Wallace, Bedford, MA (US); Jack M. Holtzman, San Diego, CA (US); Franklin P. Antonio, Del Mar, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 680 days.

(21) Appl. No.: 09/848,937

(22) Filed: May 3, 2001

(65) Prior Publication Data

US 2003/0013451 A1    Jan. 16, 2003

(51) Int. Cl.
*H04Q 7/00* (2006.01)
(52) U.S. Cl. .................................................. 370/329
(58) Field of Classification Search ................ 370/310, 370/315, 328, 329, 330, 332, 335, 336, 341, 370/342, 343–344, 345, 347
See application file for complete search history.

(56) References Cited

U.S. PATENT DOCUMENTS

| | | | | |
|---|---|---|---|---|
| 4,696,027 | A | * | 9/1987 | Bonta .......................... 455/436 |
| 5,245,629 | A | | 9/1993 | Hall ............................... 375/1 |
| 5,276,907 | A | * | 1/1994 | Meidan ....................... 455/436 |
| 5,448,750 | A | | 9/1995 | Eriksson et al. ........... 455/33.1 |
| 5,465,398 | A | * | 11/1995 | Flammer ....................... 455/69 |
| 5,844,894 | A | * | 12/1998 | Dent ........................... 370/330 |
| 5,914,950 | A | | 6/1999 | Tiedemann, Jr. et al. |
| 5,923,650 | A | * | 7/1999 | Chen et al. .................. 370/331 |
| 6,256,486 | B1 | * | 7/2001 | Barany et al. ............... 455/296 |
| 6,493,331 | B1 | * | 12/2002 | Walton et al. .............. 370/341 |

FOREIGN PATENT DOCUMENTS

| | | |
|---|---|---|
| EP | 0869626 | 10/1998 |
| WO | 9833339 | 7/1998 |
| WO | 9835514 | 8/1998 |

(Continued)

OTHER PUBLICATIONS

F. Ling, "Optimal Reception, Performance Bound, and Cut-off Rate Analysis of References-Assisted Coherent CDMA Communications with Applications," IEEE Transactions on Communications, vol. 47, No. 10, Oct. 1999 (pp. 1583-1592).

(Continued)

*Primary Examiner*—Huy D. Vu
*Assistant Examiner*—Jason Mattis
(74) *Attorney, Agent, or Firm*—Dmitry R. Milikovsky; Sandip (Micky) S. Minha; Philip R. Wadsworth

(57) ABSTRACT

Techniques to partition and allocate the available system resources among cells in a communication system, and to allocate the resources in each cell to terminals for data transmission on the uplink. In one aspect, adaptive reuse schemes are provided wherein the available system resources may be dynamically and/or adaptively partitioned and allocated to the cells based on a number of factors such as the observed interference levels, loading conditions, system requirements, and so on. A reuse plan is initially defined and may be redefined to reflect changes in the system. In another aspect, the system resources may be partitioned such that each cell is allocated a set of channels having different performance levels. In yet another aspect, terminals in each cell are scheduled for data transmission (e.g., based on their priority or load requirements) and assigned channels based on their tolerance to interference and the channels' performance.

20 Claims, 9 Drawing Sheets

FOREIGN PATENT DOCUMENTS

| | | |
|---|---|---|
| WO | 9957925 | 11/1999 |
| WO | 9965158 | 12/1999 |
| WO | 0176098 | 10/2001 |

OTHER PUBLICATIONS

Kapil Chawla et al., "Quasi-Static Resource Allocation with Interference Avoidance for Fixed Wireless Systems," IEEE Journal on Selected Areas in Communications, vol. 17, No. 3, Mar. 1999 (pp. 493-504).

Thomas K. Fong et al., "Radio Resource Allocation in Fixed Broadband Wireless Networks," IEEE Transaction on Communications, vol. 46, No. 6, Jun. 1998 (pp. 806-818).

Kin K. Leung et al., "Dynamic Allocation of Downlink and Uplink Resource for Broadband Services in Fixed Wireless Networks," IEEE Journal on Selected Areas in Communications, vol. 17, No. 5, May 1999 (pp. 990-1006).

Ishikawa, et al. "An Adaptive Channel Allocation Strategy Using Multiple Overlaid Priority for Cellular Systems" Electronics and Communications In Japan 80(2): 90-99 (1997).

Katzela, et al. "Channel Assignment Schemes for Cellular Mobile Telecommunication Systems: A Comprehensive Survey" IEEE Personal Communications 3(3): 10-31 (1996).

* cited by examiner

METHOD AND APPARATUS FOR CONTROLLING UPLINK TRANSMISSIONS OF A WIRELESS COMMUNICATION SYSTEM

BACKGROUND

1. Field

The present invention relates to data communication, and more specifically to a novel and improved method and apparatus for controlling uplink transmissions of a wireless communication system to increase efficiency and improve performance.

2. Background

Wireless communication systems are widely deployed to provide various types of communication such as voice, data, and so on, for a number of users. These systems may be based on code division multiple access (CDMA), time division multiple access (TDMA), frequency division multiple access (FDMA), or some other multiple access techniques.

In a wireless communication system, communication between users is conducted through one or more base stations. A first user on one terminal communicates with a second user on a second terminal by transmitting data on the uplink to a base station. The base station receives the data and can route the data to another base station. The data is then transmitted on the downlink from the base station to the second terminal. The downlink refers to transmission from the base station to the terminal and the uplink refers to transmission from the terminal to the base station. In many systems, the uplink and the downlink are allocated separate frequencies.

In a wireless communication system, each transmitting source (e.g., terminal) acts as potential interference to other transmitting sources in the system. To combat the interference experienced by the terminals and base stations and to maintain the required level of performance, conventional TDMA and FDMA systems resort to reuse techniques whereby not all frequency bands or time slots are used in each cell. For example, a TDMA system may employ a 7-cell reuse pattern in which the total operating bandwidth, W, is divided into seven equal operating frequency bands (i.e., B=W/7) and each cell in a 7-cell cluster is assigned to one of the frequency bands. Thus, in this system every seventh cell reuses the same frequency band. With reuse, the co-channel interference levels experienced in each cell are reduced relative to that if all cells are assigned the same frequency band. However, reuse patterns of more than one cell (such as the 7-cell reuse pattern used in some conventional TDMA systems) represent inefficient use of the available resources since each cell is allocated and able to use only a fraction of the total system resources (e.g., operating bandwidth).

CDMA systems are capable of operating with a 1-cell reuse pattern (i.e., adjacent cells can use the same operating bandwidth). First-generation CDMA systems are primarily designed to carry voice data having a low data rate (e.g., 32 kbps or less). Using code division spread spectrum, the low-rate data is spread over a wide (e.g., 1.2288 MHz) bandwidth. Because of the large spreading factor, the transmitted signal can be received at a low or negative carrier-to-noise-plus-interference (C/I) level, despread into a coherent signal, and processed. Newer generation CDMA systems are designed to support many new applications (voice, packet data, video, and so on) and are capable of data transmission at high data rates (e.g., over 1 Mbps). However, to achieve the high data rates, high C/I levels are required and the need to control interference becomes more critical.

There is therefore a need in the art for techniques to control uplink transmissions to support data transmission at high data rates and achieve better utilization of the available resources.

SUMMARY

Aspects of the invention provide techniques to (1) partition and allocate the available system resources (e.g., the spectrum) among cells in a communication system, and (2) allocate the resources in each cell to terminals for data transmission on the uplink. Both of these may be performed such that greater efficiency is achieved while meeting system requirements.

In one aspect, adaptive reuse schemes are provided wherein the available system resources may be dynamically and/or adaptively partitioned and allocated to the cells based on a number of factors such as, for example, the observed interference levels, loading conditions, system requirements, and so on. A reuse plan is initially defined and each cell is allocated a fraction of the total available system resources. The allocation may be such that each cell can simultaneously utilize a large portion of the total available resources, if desired or necessary. As the system changes, the reuse plan may be redefined to reflect changes in the system. In this manner, the adaptive reuse plan may be capable of achieving very low effective reuse factor (e.g., close to 1) while satisfying other system requirements.

In another aspect, the system resources may be partitioned such that each cell is allocated a set of channels having different performance levels. Higher performance may be achieved, for example, for lightly shared channels and/or those associated with low transmit power levels in adjacent cells. Conversely, lower performance may result, for example, from low transmit power levels permitted for the channels. Channels having different performance levels may be obtained by defining different back-off factors for the channels, as described below.

In yet another aspect, terminals in each cell are assigned to channels based on the terminals' tolerance levels to interference and the channels' performance. For example, disadvantaged terminals requiring better protection from interference may be assigned to channels that are afforded more protection. In contrast, advantaged terminals with favorable propagation conditions may be assigned to channels that are more heavily shared and/or have the greater interference levels associated with their use.

The ability to dynamically and/or adaptively allocate resources to the cells and the ability for the cells to intelligently allocate resources to the terminals enable the system to achieve high level of efficiency and performance not matched by systems that employ conventional non-adjustable, fixed reuse schemes.

The invention further provides methods, systems, and apparatus that implement various aspects, embodiments, and features of the invention, as described in further detail below

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
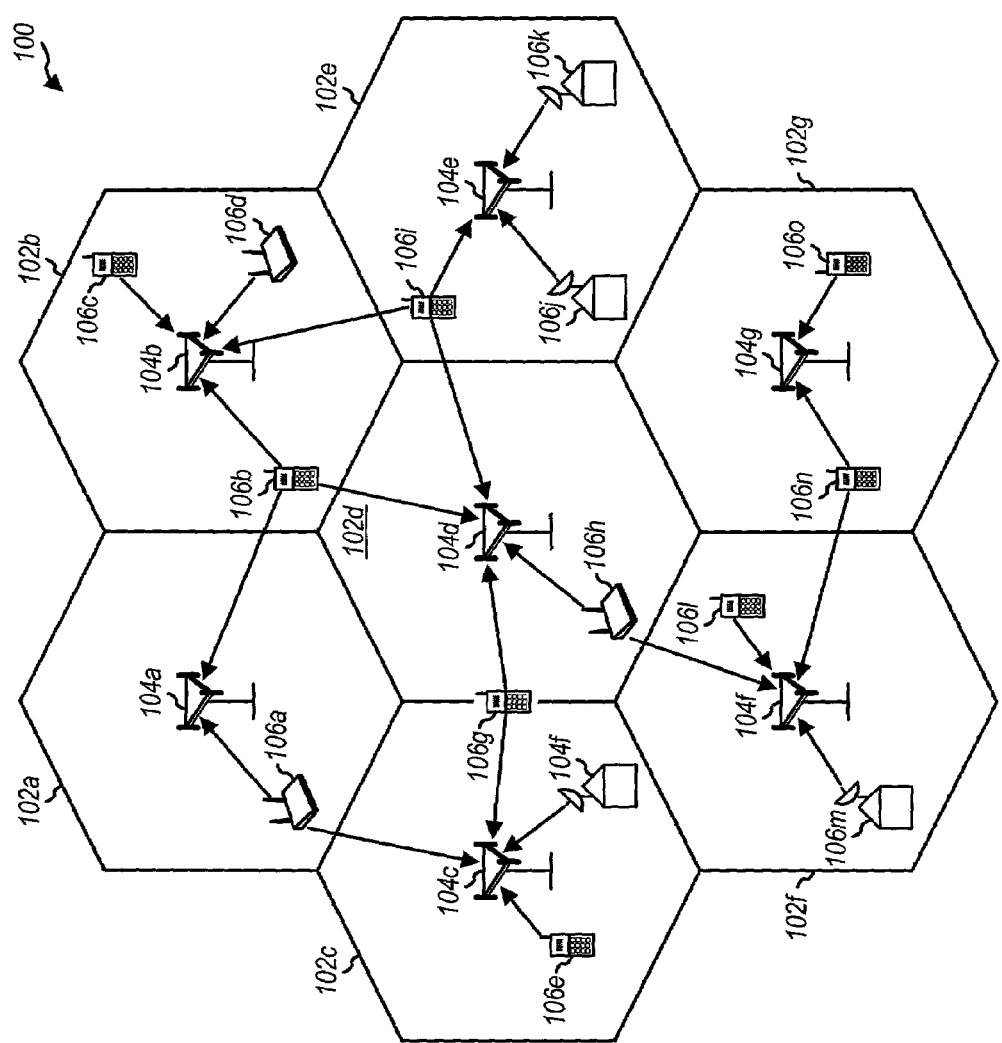
FIG. 1 is a diagram of a communication system that supports a number of users and is capable of implementing various aspects and embodiments of the invention.

FIG. 1 is a diagram of a communication system 100 that supports a number of users and is capable of implementing various aspects and embodiments of the invention. System 100 provides communication for a number of coverage areas 102a through 102g, each of which is serviced by a corresponding base station 104. Each base station's coverage area may be defined, for example, as the area over which the terminals can achieve a particular grade of service (GoS). The base station coverage areas are organized in a manner to achieve overall coverage for a designated geographic area. The base station and its coverage area are often referred to as a "cell".

As shown in FIG. 1, various terminals 106 are dispersed throughout the system. The terminals in the coverage area may be fixed (i.e., stationary) or mobile, and are generally served by a primary (i.e., serving) base station. Each terminal communicates with at least one and possibly more base stations on the downlink and uplink at any given moment depending on whether "soft handoff" is employed and/or whether the terminal is designed and operated to (concurrently or sequentially) transmit/receive multiple transmissions to/from multiple base stations. The downlink refers to transmission from the base station to the terminal, and the uplink refers to transmission from the terminal to the base station.

In FIG. 1, base station 104a receives data transmission from terminals 106a and 106b on the uplink, base station 104b receives data transmissions from terminals 106b, 106c, 106d, and 106i, base station 104c receives data transmissions from terminals 106a, 106e, 106f, and 106g, and so on. On the uplink, the transmission from each communicating terminal represents potential interference to other terminals in the system. The downlink transmissions are not shown in FIG. 1 for simplicity.

System 100 may be a multiple-input multiple-output (MIMO) system that employs multiple ($N_T$) transmit antennas and multiple ($N_R$) receive antennas for data transmission. A MIMO channel formed by the $N_T$ transmit and $N_R$ receive antennas may be decomposed into $N_C$ independent channels, with $N_C \leq \min\{N_T, N_R\}$. Each of the $N_C$ independent channels is also referred to as a spatial subchannel of the MIMO channel. The MIMO system can provide improved performance (e.g., increased transmission capacity) if the spatial subchannels created by the multiple transmit and receive antennas are utilized.

An example MIMO system is described in U.S. patent application Ser. No. 09/532,492, entitled "HIGH EFFICIENCY, HIGH PERFORMANCE COMMUNICATION SYSTEM EMPLOYING MULTI-CARRIER MODULATION," filed Mar. 30, 2000, assigned to the assignee of the present invention and incorporated herein by reference. System 100 may also be designed to implement any number of standards and designs for CDMA, TDMA, FDMA, and other multiple access schemes. The CDMA standards include the IS-95, cdma2000, W-CDMA standards, and the TDMA standards include Global System for Mobile Communications (GSM). These standards are known in the art.

In system 100, a large number of terminals share a common system resource, namely the total operating bandwidth. To achieve the desired level of performance for a particular terminal in the system, the interference from other transmissions needs to be reduced to an acceptable level. Also, to reliably transmit at high data rates for a given operating bandwidth, it is necessary to operate at or above a particular carrier-to-noise-plus-interference (C/I) level. Reduction in interference and attainment of the required C/I are conventionally achieved by dividing the total available resource into fractions, each of which is then assigned to a particular cell in the system.

For example, the total operating bandwidth, W, can be divided into $N_r$ equal operating frequency bands (i.e., B=W/$N_r$), and each cell can then be assigned to one of the $N_r$ frequency bands. The frequency bands are periodically reused to achieve higher spectral efficiency. For a 7-cell reuse pattern such as that supported by FIG. 1, cell 102a may be assigned the first frequency band, cell 102b may be assigned the second frequency band, and so on, and cell 102g may be assigned the seventh frequency band.

A communication system is typically designed to conform to a number of system requirements that may include, for example, quality of service (QoS), coverage, and performance requirements. Quality of service is typically defined as every terminal in the coverage area being able to achieve a specified minimum average bit rate a prescribed percentage of the time. For example, the system may be required to support any terminal within the coverage area with a minimum average bit rate of at least 1 Mbps for 99.99% of the time. The coverage requirement may dictate that a particular percentage (e.g., 99%) of the terminals with received signal levels exceeding a particular C/I threshold be able to achieve the specified grade of service. And the performance requirements may be defined by some particular minimum average bit rate, bit-error-rate (BER), packet-error-rate (PER), frame-error-rate (FER), or some other requirements. These requirements impact the allocation of the available resources and the system efficiency, as described below.

Figure 2:
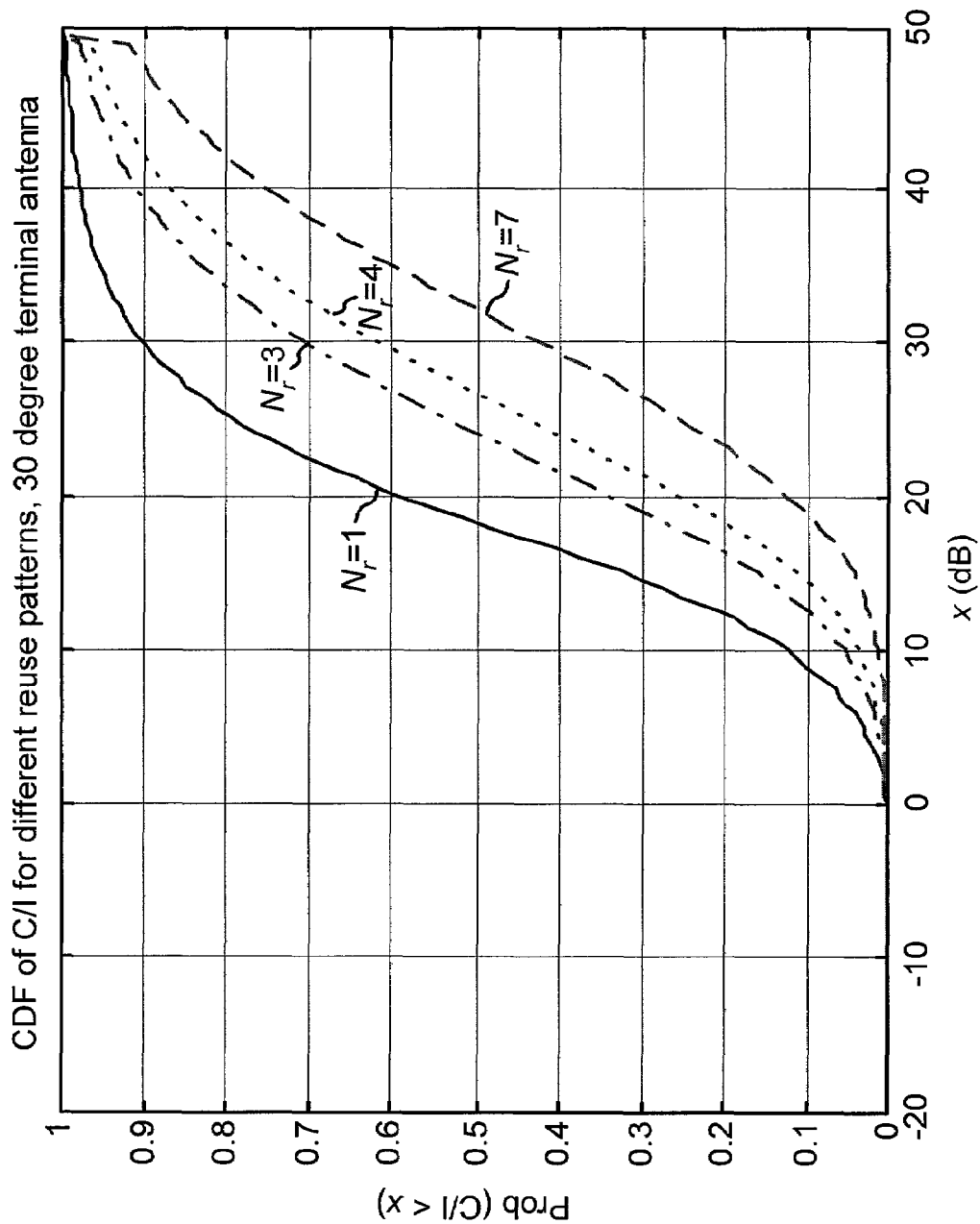
FIG. 2 shows cumulative distribution functions (CDFs) of the C/I achieved for a number of fixed reuse patterns for a particular communication system.

FIG. 2 shows example cumulative distribution functions (CDFs) of the C/I achieved for terminals in a communication system based on a number of reuse patterns obtained from simulation of terminals randomly distributed throughout the coverage area. The horizontal axis, x, represents C/I, and the vertical axis represents the probability that the C/I achieved for a particular terminal is less than the value shown in the horizontal axis, i.e., P(C/I<x). As shown in FIG. 2, virtually no terminals achieve a C/I worse than 0 dB. FIG. 2 also shows that the probability of greater C/I increases with greater reuse. Thus, the P(C/I>x) for the 7-cell reuse pattern is greater than the P(C/I>x) for the 1-cell reuse pattern.

The C/I CDFs in FIG. 2 may be used to characterize the potential performance of the system. As an example, assume that a C/I of at least 10 dB is required to meet a minimum instantaneous bit rate of 1 Mbps for 99.99% of the time. Using a reuse factor of one (i.e., $N_r=1$, every cell reuses the same channel), the probability of not achieving the required performance (i.e., the outage probability) is approximately 12%. Similarly, cell reuse factors of three, four, and seven correspond to outage probabilities of 5.4%, 3.4%, and 1.1%, respectively. Thus in order to achieve a 10 dB C/I for 99% of the terminals, a reuse factor of at least seven ($N_r \geq 7$) is required in this example.

A number of modulation schemes may be used to modulate data prior to transmission. Such modulation schemes include M-ary phase shift keying (M-PSK), M-ary quadrature amplitude modulation (M-QAM), and others. In general, bandwidth-efficient modulation schemes such as M-QAM are able to transmit a higher number of information bits per modulation symbol, but require high C/I to achieve the desired level of performance. Table 1 lists the spectral efficiency of a number of bandwidth-efficient modulation schemes, which is quantified by the number of information bits transmitted per second per Hertz (bps/Hz). Table 1 also lists the assumed required C/I to achieve 1% bit error rate for these modulation schemes.

TABLE 1

| Modulation Scheme | Modulation Efficiency (bps/Hz) | Required C/I (in dB) for 1% BER |
|---|---|---|
| BPSK | 1 | 4.3 |
| QPSK | 2 | 7.3 |
| 8-PSK | 3 | 12.6 |
| 16-QAM | 4 | 14.3 |
| 32-QAM | 5 | 16.8 |
| 64-QAM | 6 | 20.5 |

The average channel efficiency, $E_{CH}$, of a particular reuse scheme may be determined based on the CDF of the achievable C/I for the scheme (as shown in FIG. 2) and the achievable modulation efficiency as a function of C/I (as shown in Table 1). If the most efficient modulation scheme is used whenever possible, then the average channel efficiency, $E_{CH}$, may be derived as a weighted sum of the modulation efficiencies, with the weighting being determined by the probability of achieving the required C/I. For example, if BPSK through 64-QAM are employed by the system whenever possible, the average channel efficiency can be computed as follows:

$$E_{CH} = 1 \cdot P(4.3 < C/I < 7.3) +$$
$$2 \cdot P(7.3 < C/I < 12.6) +$$
$$3 \cdot P(12.6 < C/I < 14.3) +$$
$$4 \cdot P(14.3 < C/I < 16.8) +$$
$$5 \cdot P(16.8 < C/I < 20.3) +$$
$$6 \cdot P(20.5 < C/I).$$

Table 2 lists (in column 2) the average channel efficiencies for various reuse factors (e.g., 1-cell, 3-cell, 5-cell, and 7-cell). Table 2 also provides (in column 3) the average spectral (i.e., overall) efficiencies for these reuse factors, which are derived by dividing the average channel efficiencies by the reuse factors. From Table 2, it can be observed that the average channel efficiency increases as reuse increases. However, this gain in channel efficiency with increasing reuse is more than offset by the loss in overall spectral efficiency that results from allowing each cell to use only a fraction of the total available resources for the system. Thus, the overall spectral efficiency decreases with increasing reuse.

TABLE 2

| Cell Reuse Factor $N_r$ | Average per Channel Efficiency (bps/channel) | Average Spectral Efficiency (bps/Hz/cell) |
|---|---|---|
| 1 | 4.4 | 4.4 |
| 3 | 5.18 | 1.73 |
| 4 | 5.4 | 1.35 |
| 7 | 5.75 | 0.82 |

As indicated in FIG. 2 and Table 2, the C/I for a given terminal may be improved if the interference from terminals in neighboring cells is reduced by employing a higher reuse factor. However, in a multiple access system composed of many cells, maximizing the C/I for a single terminal in one cell typically implies that the resource cannot be reused in some other cells in the system. Thus, although higher C/I and higher throughput may be achieved for some of the terminals with higher reuse factor, the overall system throughput can decrease since the number of terminals allowed to transmit simultaneously using the same channel decreases with higher reuse factor.

Conventionally, systems that require high C/I operating points employ fixed reuse schemes. In these fixed-reuse systems, a "channel" made available for use by a terminal in one cell may only be reused in another cell with the same channel reuse pattern. For example, consider a 3-cell reuse cluster containing cells 1, 2 and 3. In this scheme different channel sets are allocated to each cell in this first reuse cluster. The channels in the set allocated to any one cell in a reuse cluster are orthogonal to the channels in the other sets allocated to the other cells in the cluster. This strategy reduces or eliminates mutual interference caused by terminals within a reuse cluster. The reuse cluster is repeated throughout the network in some prescribed fashion. So for example, a second reuse cluster of cells 4, 5 and 6 would be permitted to use the same channel set as cells 1, 2 and 3, respectively. The interference to terminals in the cells in the first reuse cluster caused by terminals in the second reuse cluster is reduced due to the increased separation between cells using the same channel set. The increased separation implies increased path loss, and lower interference power. While fixed reuse schemes may be used to maximize the percentage of terminals meeting the minimum required C/I, they are generally inefficient because they employ a high reuse factor.

Aspects of the invention provide techniques to (1) partition and allocate the available system resources (e.g., the spectrum) among cells in a communication system, and (2) allocate the resources in each cell to terminals for data transmission on the uplink. Both of these may be performed such that greater efficiency than fixed reuse schemes is achieved while meeting system requirements. Certain aspects of the invention are based on several key observations.

First, the uplink is different from the downlink since the transmissions from the terminals may be coordinated by the system for increased efficiency. The system (e.g., cells) receives information that describes certain characteristics of the terminals in the system (e.g., their path losses to the serving cells). This information may then be used to determine how to best schedule terminals for data transmission on the uplink. Coordination of the uplink data transmission allows for various benefits such as (1) increased uplink throughput on a system-wide basis, and (2) smaller variations in performance observed by terminals in the system, which implies that a more uniform quality of service (QoS) may be delivered to the terminals.

Second, the terminals in the system typically have different tolerance levels for interference. Disadvantaged terminals such as those near the cell borders, with poor shadowing/geometry, must transmit at higher power to overcome their large path loss. In essence, these terminals have small link margins, where link margin is defined as the difference between their peak power constraint and the transmitted power needed to achieve a desired C/I operating point at the cell site. As a consequence, these terminals are more vulnerable to interference from other terminals and also tend to cause greater levels of interference to terminals in nearby cells. In contrast, advantaged terminals such as those closer to the cell site, with favorable propagation loss and shadowing, are more tolerant to interference since they have larger link margins. In addition, these advantaged terminals tend to contribute less to the interference power seen by terminals in other cells.

In a typical system, a large percentage of the terminals in the system are able to achieve a C/I that equals or exceeds a setpoint. The setpoint is a particular C/I required to achieve the desired level of performance, which may be quantified as, e.g., a particular average data rate at 1% BER or 0.01% outage probability, or some other criterion. For these terminals, a unity reuse pattern may be employed to achieve high efficiency for the system. Only a fraction of the terminals in the system are typically disadvantaged at any given time. For the fraction of terminals that achieve a C/I below the setpoint, some other reuse schemes and/or some other techniques may be employed to provide the required performance.

In one aspect, adaptive reuse schemes are provided wherein the available system resources may be dynamically and/or adaptively partitioned and allocated to the cells based on a number of factors such as, for example, the observed loading conditions, system requirements, and so on. A reuse plan is initially defined and each cell is allocated a fraction of the total available system resources. The allocation may be such that each cell can simultaneously utilize a large portion of the total available resources, if desired or necessary. As the system changes, the reuse plan may be redefined to reflect changes in the system. In this manner, the adaptive reuse plan may be capable of achieving very low effective reuse factor (e.g., close to 1) while satisfying other system requirements.

In another aspect, the system resources may be partitioned such that each cell is allocated a set of channels having different performance levels. Higher performance may be achieved, for example, for lightly shared channels and/or those associated with low transmit power levels in adjacent cells. Conversely, lower performance may result, for example, from low transmit power levels permitted for the channels. Channels having different performance levels may be obtained by defining different back-off factors for the channels, as described below.

In yet another aspect, terminals in each cell are assigned to channels based on the terminals' tolerance levels to interference and the channels' performance. For example, disadvantaged terminals requiring better protection from interference may be assigned to channels that are afforded more protection. In contrast, advantaged terminals with favorable propagation conditions may be assigned to channels that are more heavily shared and/or have the greater interference levels associated with their use.

The ability to dynamically and/or adaptively allocate resources to the cells and the ability for the cells to intelligently allocate resources to the terminals enable the system to achieve high level of efficiency and performance not matched by systems that employ conventional non-adjustable, fixed reuse schemes. The techniques described herein may be applied to any communication systems that experience interference such as, for example, wireless (e.g., cellular) communication systems, satellite communication systems, radio communication systems, and other systems in which reuse can improve performance. In one specific implementation, these techniques may be advantageously used to improve the spectral efficiency of a fixed-terminal, multiple access communication system designed to accommodate high data rate services.

Adaptive Reuse Schemes

The adaptive reuse schemes may be designed to exploit certain characteristics of the communication system to achieve high system performance. These system characteristics include loading effects and the terminal's different tolerance to interference.

The loading at the cells affects the overall performance (e.g., throughput) of the system. At low loads, the available system resources may be divided into sets of "orthogonal" channels, which may then be assigned to the cells, one channel set per cell in a reuse cluster. Because the channels in each set are orthogonal to the channels in other sets, interference on these orthogonal channels is low and high C/I values may be achieved. As the load increases, the number of orthogonal channels in each set may be insufficient to meet demands, and the cells may be allowed to deviate from the use of only the orthogonal channels. The transmissions on non-orthogonal channels increase the average interference levels observed in the channels used. However, by properly controlling the transmission levels on non-orthogonal channels, the amount of interference may be controlled and high performance may be achieved even at higher loads.

As the load increases, the number of active terminals desiring to transmit data also increases, and the pool of terminals from which a cell may select to schedule for data transmission and to assign channels also increases. Each terminal in the pool presents interference to other terminals in the system, and this level may be dependent (in part) on the particular location of the terminal to the serving cell as well as other neighbor cells. In addition, terminals with greater link margin have a greater tolerance to other-user interference. The terminals' different interference characteristics can be exploited in scheduling terminals and assigning channels to achieve tight reuse (i.e., close to unity). In particular, as the load increases, terminals with higher tolerance to interference may be assigned to channels having greater likelihood of receiving high interference levels.

Figure 3:
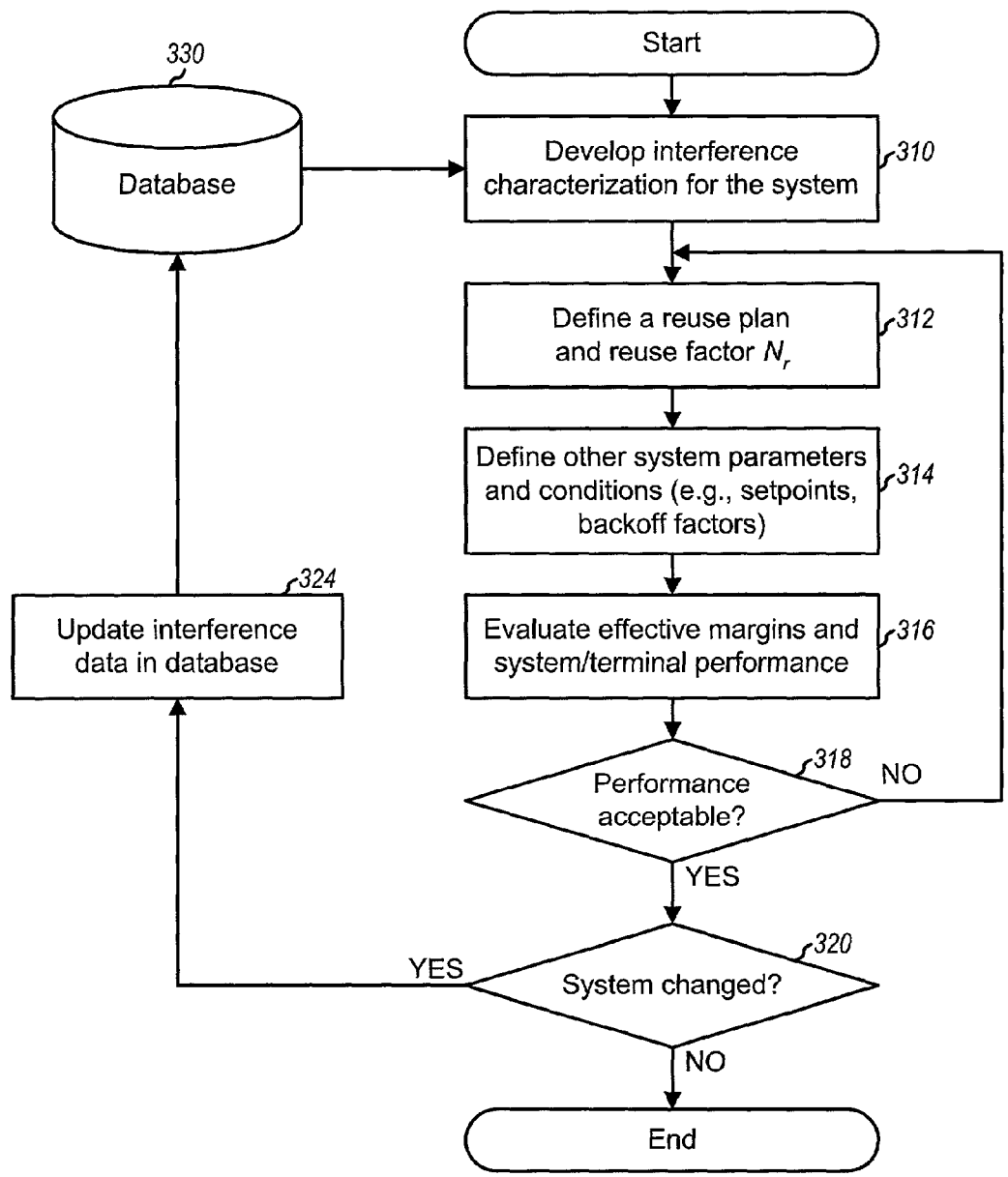
FIG. 3 is a flow diagram of a specific implementation of an adaptive reuse scheme, in accordance with an embodiment of the invention.

FIG. 3 is a flow diagram of an adaptive reuse scheme in accordance with an embodiment of the invention. The development of a reuse plan and the adaptation of the plan to changing system conditions may be performed concurrent with normal operation of the communication system.

Initially, the system is characterized, at step 310, for one or more parameters and based on information collected for the system and which may be stored in a database 330. For example, the interference experienced by the terminals, as observed at each cell, may be determined and an interference characterization may be developed, as described below. The interference characterization may be performed on a per cell basis, and may involve developing a statistical characterization of the interference levels such as a power distribution. The information used for the characterization may be updated periodically to account for new cells and terminals, and to reflect changes in the system.

A reuse plan is then defined using the developed system characterization and other system constraints and considerations, at step 412. The reuse plan encompasses various components such as a particular reuse factor $N_r$ and a particular reuse cell layout based on the reuse factor $N_r$. For example, the reuse factor may correspond to a 1-cell, 3-cell, 7-cell, or 19-cell reuse pattern or cluster. The selection of the reuse factor and the design of the reuse cell layout may be achieved based on the data developed in step 310 and any other available data. The reuse plan provides a framework for operation of the system.

Additional system parameters and/or operational conditions are then defined, at step 314. This typically includes partitioning the total available system resources into channels, with the channels corresponding to time units, frequency bands, or some other units, as described below. The number of channels, $N_c$, to be employed may be determined based on the reuse plan defined in step 312. The available channels are then associated into sets and each cell is allocated a respective channel set. The sets can include overlapping channels (i.e., a particular channel may be included in more than one set). Resource partition and allocation are described in further detail below.

Other parameters may also be defined in step 314 such as, for example, the scheduling interval, the operating points or setpoints of the cells in the system, the back-off factors associated with the allocated channel set, the back-off factor limits, the step sizes for adjustments to the back-off factors, and others. The back-off factors determine the reductions in the peak transmit power levels for the channels. These parameters and conditions, which are described in further detail below, are akin to a set of operating rules to be followed by the cells during normal operation.

The system then operates in accordance with the defined reuse plan and the cells receive transmissions from terminals scheduled for data transmission. During the course of normal operation, the system performance is evaluated for the defined reuse plan, at step 316. Such evaluation may include, for example, determining the effective path losses from each terminal to several nearby cells and the associated link margins, the throughputs, the outage probabilities, and other measures of performance. For example, the effective link margin for each scheduled terminal in each channel in each cell may be computed. Based on the computed link margins, an estimate of the average throughput of the system can be developed as well as the individual performance of the terminals.

Once the system performance has been evaluated, a determination is made on the effectiveness (i.e., the performance) of the defined reuse plan, at step 318. If the system performance is not acceptable, the process returns to step 312 and the reuse plan is redefined. The system performance may be unacceptable if it does not conform to a set of system requirements and/or does not achieve the desired performance level. The redefined reuse plan may include changes to various operating parameters, and may even include the selection of another reuse pattern and/or reuse cell layout. For example, if excessive interference is encountered, the reuse pattern may be increased (e.g., from 3-cell to 7-cell).

Steps 312 through 318 are performed iteratively until the system goals are achieved (e.g., maximized throughput while simultaneously satisfying the minimum performance requirements for the terminals in the coverage area). Steps 312 through 318 also represent an ongoing process while the system is operational.

If the system performance is acceptable (i.e., does conform to the system requirements), a determination is then made whether the system has changed, at step 320. If there are no changes, the process terminates. Otherwise, database 330 is updated, at step 324, to reflect changes in the system, and the system is recharacterized. The steps in FIG. 3 are described in further detail below.

The process shown in FIG. 3 may be performed periodically or whenever system changes are detected. For example, the process may be performed as the system grows or changes, e.g., as new cells and terminals are added and as existing cells and terminals are removed or modified. The process allows the system to adapt to changes, for example, in the terminal distribution, topology, and topography.

Channels

The resource sharing among cells and terminals may be achieved using time division multiplexing (TDM), frequency division multiplexing (FDM), code division multiplexing (CDM), other multiplexing schemes, or any combinations thereof. The available system resources are partitioned into fractions using the selected multiplexing scheme(s).

For TDM-based schemes, the transmission time is partitioned into time units (e.g., time slots or frames), and each cell is allocated a number of time units. For each time unit, the total operating bandwidth of the system can be assigned to one or more terminals by the cell allocated with that time unit. For FDM-based schemes, the total operating bandwidth can be divided into frequency bands, and each cell is allocated a set of frequency bands. Each cell can then assign the allocated frequency bands to terminals within its coverage areas, and thereafter (simultaneously) receive data transmission from the terminals via these frequency bands. For CDM-based schemes, codes can be defined for the system and each cell may be allocated a set of codes. Each cell can then assign the allocated codes to terminals within its coverage areas, and thereafter (simultaneously) receive data transmission via these codes. Furthermore, combinations of these schemes can also be used in the partitioning process. For example, certain code channels within a CDMA system may be associated with a particular time slot or frequency channel. Common rules governing the use of these partitioned channels are then defined.

Figure 4:
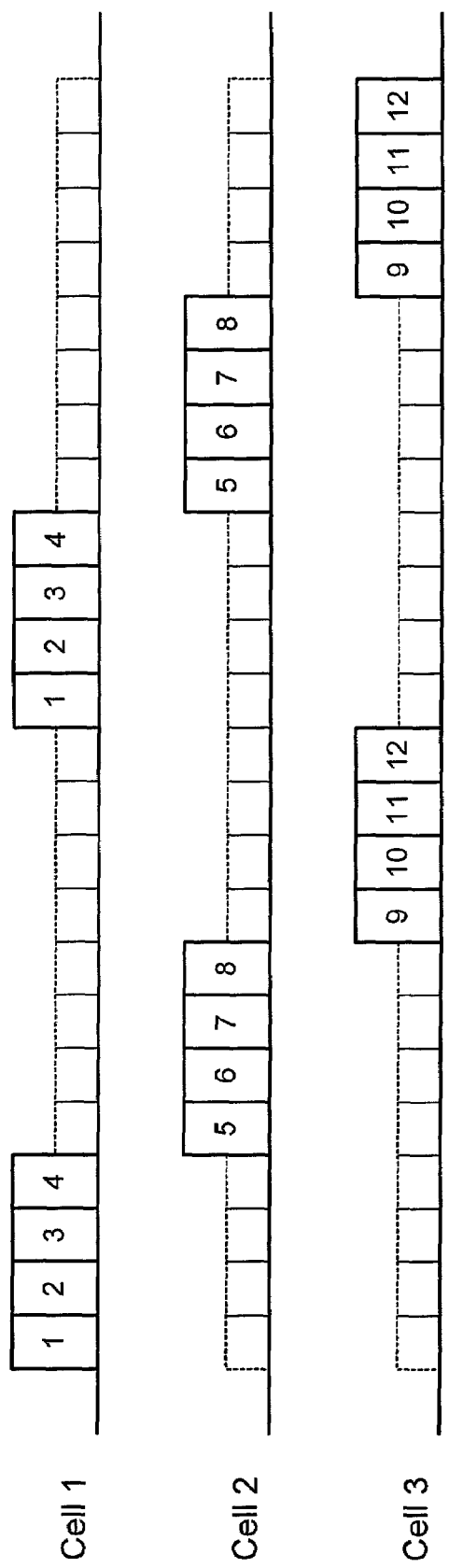
FIG. 4 is a diagram of an embodiment of a resource partitioning and allocation for a 3-cell reuse pattern.

FIG. 4 is a diagram of an embodiment of a resource partitioning and allocation for a 3-cell reuse pattern (i.e., $N_r=3$). In this example, the system resource is divided into 12 fractions. The division can be implemented in the time, frequency, or code domain, or a combination of these. Thus, the horizontal axis in FIG. 4 can represent either time of frequency, depending on whether TDM or FDM is employed. For example, the 12 fractions can represent 12 time division multiplexed time slots for a TDM-based scheme or 12 frequency bands for an FDM-based scheme. Each of the fractions is also referred to herein as a "channel", and each channel is orthogonal to the other channels.

For the 3-cell reuse pattern, the system resources may be partitioned by grouping the available channels into three sets, and each cell in a 3-cell cluster can be allocated one of the channel sets. Each channel set includes some or all of the 12 available channels, depending on the particular reuse scheme being employed. For the embodiment shown in FIG. 4, each cell is allocated an equal number of channels, with cell 1 being allocated channels 1 through 4 for transmission at full power, cell 2 being allocated channels 5 through 8, and cell 3 being allocated channels 9 through 12. In some other embodiments, each cell may be allocated a respective channel set that can include any number of channels, some of which may also be allocated to other cells.

Back-Off Factors

In an aspect, a channel structure is defined and employed by the system such that as the load increases, reliable performance is achieved using the channels a large percentage of the time. For a particular cell, it is likely that some terminals are more immune to other-cell interference than some other terminals. By providing a channel structure that takes advantage of this fact, improvement in the system throughput and performance may be realized.

For the channel structure, each cell in a reuse cluster is allocated a respective set of channels that may then be assigned to terminals in its coverage area. Each cell is further assigned a set of back-off factors for the set of allocated channels. The back-off factor for each allocated channel indicates the maximum percentage of full transmit power that may be used for the channel. The back-off factor may be any value ranging from zero (0.0) to one (1.0), with zero indicating no data transmission allowed on the channel and one indicating data transmission at up to full transmit power. The back-off factors result in channels capable of achieving different performance levels.

The back-off from full transmit power can be applied in one or more selected channels, at one or more selected time slots, by one or more selected cells, or any combination thereof. The back-off can additionally or alternatively be applied to selected terminals in the cell. In an embodiment, each cell applies a back-off for each channel assigned for data transmission, with the specific value for the back-off being based on the operating conditions of the cell such that the desired performance is achieved while limiting the amount of interference to terminals in other cells.

The back-off factors for each cell can be determined based on a number of factors. For example, the back-off factors can be determined to take into consideration the characteristics of the terminals, the loading conditions at the cells, the required performance, and so on. The set of back-off factors assigned to each cell may be unique, or may be common among different cells in the system. In general, the channels allocated to each cell and the assigned back-off factors may change dynamically and/or adaptively based on, for example, the operating conditions (e.g., the system load).

In one embodiment, the back-off factors for each cell are determined based on the distribution of the achievable C/I values for the total ensemble of (active) terminals in the cell. A non-uniform weighting of these terminals may be applied, for example, based on their profile, as described below. This weighting may be made adaptive and/or dynamic, e.g., time-of-day dependent.

On the uplink, the C/I for a specific terminal may be determined at the cell based on, for example, a pilot signal transmitted by the terminal. The C/I for the terminal is dependent on various factors including (1) that terminal's path loss to the serving (or home) cell and (2) the other-cell interference level. In a fixed-terminal system, the path loss for a terminal does not change appreciably and the prediction of the terminal's signal level ("C") may be accurately made. The other-cell interference level (i.e., a portion of "I") depends on the path losses from other interfering terminals to their serving cells as well as the path losses from these terminals to the cell of interest. Accurate estimation of the other-cell interference levels typically requires the instantaneous knowledge of which terminals in other cells are transmitting and their power levels.

A number of assumptions may be made to simplify the interference characterization. For example, each cell may place an upper bound on the other-cell interference levels. This may be accomplished by assuming that one terminal in each cell is allowed to transmit on each channel, in which case the worst case other-cell interference levels may be determined based on the assumption that the interfering terminals will transmit at full power. Correspondingly, the worst-case C/I for each terminal in each cell may be estimated based on the assumption that this terminal and other interfering terminals will be transmitting at full power. The C/I values for the terminals in each cell may be collected and used to characterize an effective C/I CDF for the cell.

Figure 5:
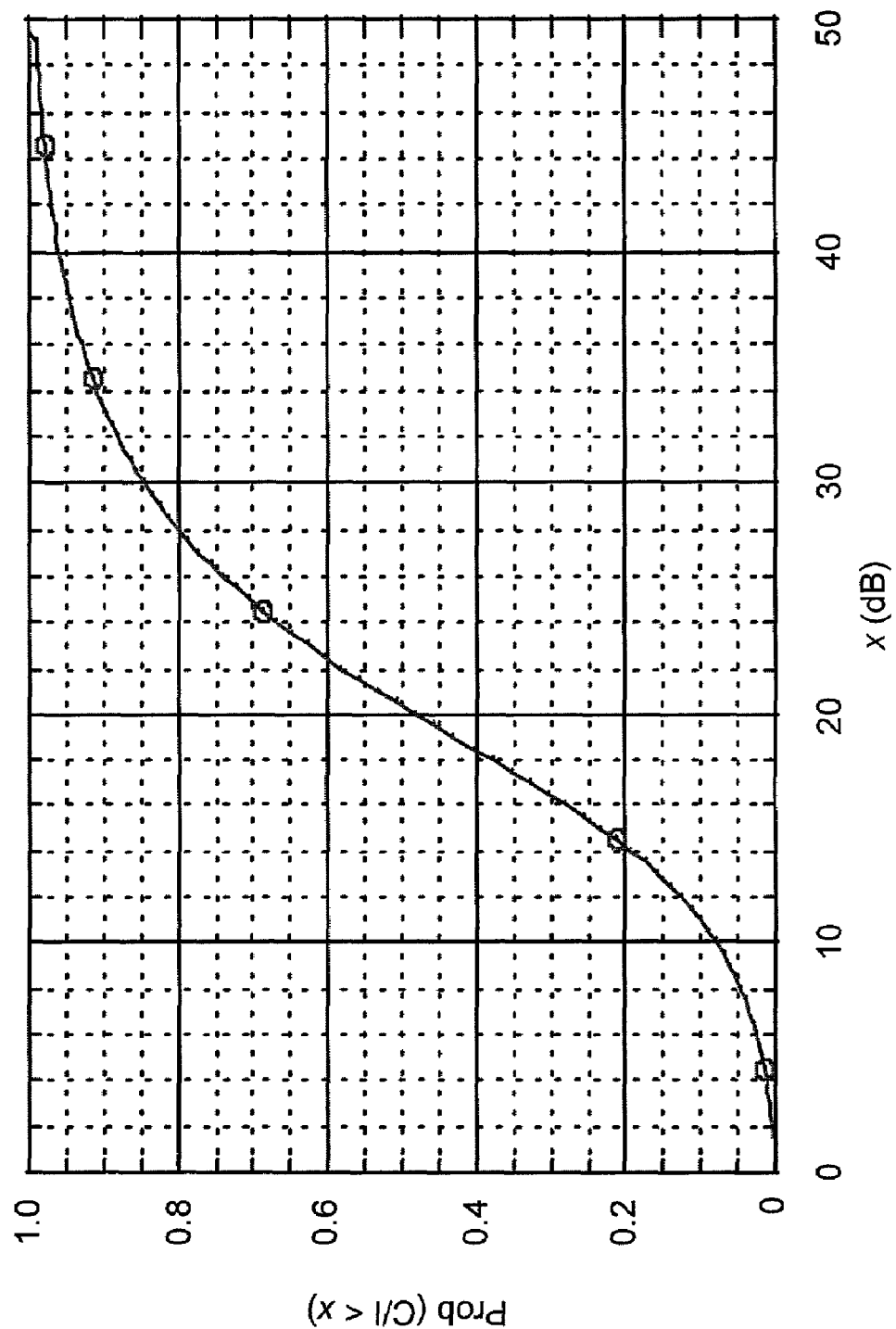
FIG. 5 shows a CDF of the achieved C/I for a 1-cell reuse pattern with all cells transmitting at full power.

FIG. 5 is an example of a CDF of the C/I achieved by terminals in a cell for a 1-cell reuse pattern with one terminal transmitting at full power on each channel in each cell. The C/I CDF provides an indication of the percentage of terminals in the cell that have a C/I greater than a particular C/I value when the terminals are transmitting at full power. From FIG. 5, it can be seen that terminals within the cell have different C/I characteristics. These terminals may be able to achieve different levels of performance or, for a particular level of performance, may need to transmit at different power levels. Terminals with smaller path losses to the serving cell typically have higher C/I, which implies that they will be able to achieve higher throughput.

In an aspect, the terminals in each cell are categorized based on their link margins, and the back-off factors are selected based on the link margin categorization. Using the example C/I distribution shown in FIG. 5, the population of terminals may be categorized into sets, with each set including terminals experiencing similar other-cell interference levels (i.e., having C/I within a range of values). As an example, the CDF shown in FIG. 5 can be partitioned into $N_c$ sets, where $N_c$ is the total number of channels allocated per cell. The sets may be selected to be equal size (i.e., the same percentage of terminals is included in each set), although non-equal size set partitions may also be defined.

Table 3 identifies the $N_c=12$ terminal sets and (column 2) tabulates the minimum C/I for the terminals in each of the 12 terminal sets. Since there are 12 terminal sets and each set is equal size, each set includes approximately 8.3% of the terminals in the cell. The first set includes terminals having C/I of 10 dB or less, the second set includes terminals having C/I ranging from 10 dB to 13 dB, the third set includes terminals having C/I ranging from 13 dB to 15 dB, and so on, and the last set includes terminals having C/I greater than 34.5 dB.

TABLE 3

| Terminal Set | Minimum C/I in Range (dB) | s(n) (dB) | β(n) |
|---|---|---|---|
| 1 | <10 | <−5 | 1.0000 |
| 2 | 10 | −5 | 1.0000 |
| 3 | 13 | −2 | 1.0000 |
| 4 | 15 | 0 | 1.0000 |
| 5 | 17 | 2 | 0.6310 |
| 6 | 18.5 | 3.5 | 0.4467 |
| 7 | 20.5 | 5.5 | 0.2818 |

TABLE 3-continued

| Terminal Set | Minimum C/I in Range (dB) | s(n) (dB) | β(n) |
|---|---|---|---|
| 8 | 22 | 7 | 0.1995 |
| 9 | 24 | 9 | 0.1259 |
| 10 | 26 | 11 | 0.0794 |
| 11 | 29.5 | 14.5 | 0.0355 |
| 12 | >34.5 | >19.5 | 0.0112 |

The cells may be designed to support a particular setpoint γ (or operating point), which is the minimum required C/I in order to operate at a desired data rate with an acceptable error rate. In typical systems, the setpoint is a function of the instantaneous data rate selected by the terminals, and may thus vary from terminal to terminal. As a simple example, it is assumed that a setpoint of 15 dB is required by all terminals in the cell.

The minimum link margin, s(n), for each set of terminals can then be $$s(n)=\min\{C/I(n)\}-\gamma; n=1,2,\ldots,N_c. \quad \text{Eq}(1)$$

The minimum link margin, s(n), for each set of terminals is the difference between the minimum C/I of the terminals in the set and the setpoint γ. The minimum link margin s(n) represents the deviation from the required transmit power to the setpoint based on the assumption of full transmit power from all terminals in the system. A positive link margin indicates that the C/I is greater than necessary to achieve the desired level of performance defined by the setpoint. Thus, the transmit power to these terminals may be reduced (i.e., backed-off) by the amount proportional to their link margin and still provide the desired level of performance.

The back-off factors for each cell may then be derived based on knowledge of the path losses to the terminals served by the cell and the characterization of the other-cell interference levels. If the maximum transmit power level is normalized as 1.0, the normalized back-off factor for each set of terminals can be expressed as:

$$\beta(n)=\min(1.0, 10^{-0.1 \cdot s(n)}); n=1, 2, \ldots, N_c. \quad \text{Eq}(2)$$

The back-off factor associated with a particular terminal set represents the reduction in the transmit power that can be applied to that set of terminals while still maintaining the desired setpoint γ, and thus the desired level of performance. The back-off in transmit power is possible because these terminals enjoy better C/I. By reducing the transmit power of a scheduled terminal by the back-off factor, the amount of interference to terminals in other cells can be reduced without impacting the performance of this terminal.

Table 3 lists the minimum link margin s(n) (in column 3) and the back-off factor (in column 4) for each set of terminals for a setpoint γ of 15 dB. As shown in Table 3, channels 1 through 4 have link margins of 0 dB or less and channels 5 through 12 have progressively better link margins. Consequently, channels 1 through 4 are operated at full power and channels 5 through 12 are operated at progressively reduced power. The back-off factors may be imposed on transmissions from terminals in the associated terminal sets. For example, since the terminals in set 5 have C/I of 17 dB or better and a minimum link margin s(n) of 2 dB, then the transmit power from these terminals may be backed off to 63.1% of peak transmit power.

For terminals having C/I that are below the setpoint γ, a number of options may be applied. The data rate of the transmission from these terminals may be reduced to that which can be supported by the C/I. Alternatively, the interfering terminals that cause the low C/I may be requested to (temporarily) reduce their transmit power or to stop transmitting on the affected channels until the low C/I terminals are satisfactorily served.

In an embodiment, once the back-off factors are determined for one cell in a reuse pattern, the back-off factors for other cells in the reuse pattern can be staggered. For example, for a $N_r=3$ (i.e., 3-cell) reuse pattern that operates with 12 channels and uses an $N_s=4$ channel offset, the back-off factors for cell 2 can be offset by four modulo-$N_c$ and the back-off factors for cell 3 can be offset by eight modulo-$N_c$. For this reuse pattern, cell 1 applies the back-off factors associated with channel set 1 (which includes the channels and their back-off factors shown in the fourth column in Table 3), cell 2 applies the back-off factors associated with channel set 2 (which includes the channels and back-off factors shown in the fourth column in Table 3 but shifted down by four channels and wrapped around), and cell 3 applies the back-off factors associated with channel set 3 (which includes the channels and back-off factors shown in Table 3 but shifted down by eight channels and wrapped around). A 4-channel offset is employed in this example, but other offsets may also be used.

Table 4 tabulates the back-off factors for cell 1 through 3 using the back-off factors shown in Table 3 and a four-channel offset. For example, for channel 1, cell 1 applies the back-off factor associated with channel 1 of set 1, cell 2 applies the back-off factor associated with channel 9 of set 1, and cell 3 applies the back-off associated with channel 5 of set 1.

TABLE 4

| Channel, n | $\beta_1(n)$ Cell 1 | $\beta_2(n)$ Cell 2 | $\beta_3(n)$ Cell 3 |
|---|---|---|---|
| 1 | 1.0000 | 0.1259 | 0.6310 |
| 2 | 1.0000 | 0.0794 | 0.4467 |
| 3 | 1.0000 | 0.0355 | 0.2818 |
| 4 | 1.0000 | 0.0112 | 0.1995 |
| 5 | 0.6310 | 1.0000 | 0.1259 |
| 6 | 0.4467 | 1.0000 | 0.0794 |
| 7 | 0.2818 | 1.0000 | 0.0355 |
| 8 | 0.1995 | 1.0000 | 0.0112 |
| 9 | 0.1259 | 0.6310 | 1.0000 |
| 10 | 0.0794 | 0.4467 | 1.0000 |
| 11 | 0.0355 | 0.2818 | 1.0000 |
| 12 | 0.0112 | 0.1995 | 1.0000 |

At low loads, each of the cells assigns terminals to the "better" allocated channels. For the channel allocation shown in Table 4, the terminals in cell 1 are assigned to channels 1 through 4, the terminals in cell 2 are assigned to channels 5 through 8, and the terminals in cell 3 are assigned to channels 9 through 12. When the load in each cell is four terminals or less, there is no co-channel interference from the terminals in the adjacent cells (since the 12 channels are orthogonal to one another), and each terminal should be able to achieve its setpoint at the cell for uplink transmission. When the load in any of the cells exceeds four terminals, then that cell may assign certain terminals to those channels that are not orthogonal to those of the other cells. Since the load typically varies independently in each cell, it is possible that the non-orthogonal channel assigned will not be occupied by any of the adjacent cells. The probability of this event (i.e., the probability of "non-collision") is a function of the load in each of the adjacent cells.

The channel structure with back-off may result an increase in the effective margin observed by all terminals in the system. The back-off factors shown in Table 4 are initially derived based on the C/I CDF shown in FIG. 5, which is generated with the assumption that terminals in other cells are transmitting at full power. However, when the back-off factors are applied along with a staggered channel reuse scheme as shown in Table 4, the actual C/I values achieved by the terminals in each cell may be greater than the minimum C/I values provided in column 2 of the Table 3 since the interference from the terminals in other cells is reduced by the applied back-off factors.

As an illustration, consider a case where a terminal achieved a C/I of 17 dB in cell 1. Cell 1 may then assign channel 5 to this terminal. A terminal in cell 2 is allowed to transmit at full power on this channel and a terminal in cell 3 is allowed to transmit at 12.6% of full power. The 17 dB C/I for the terminal in cell 1 was computed based on full transmit power and worst-case interference assessment. However, since the power transmitted by the terminal in cell 3 is reduced from 1.0 to 0.126, the effective margin for the terminal in cell 1 will increase. The actual amount of increase in the link margin depends on the path loss from the backed-off interfering terminal (assigned to channel 5 in cell 3) to cell 1.

As a simple example, the terminals in each cell may be categorized into three different sets having 0 dB margin, 3 dB margin, and 6 dB margin. Terminals with 0 dB margin would be allowed to transmit at full power (when scheduled), terminals with 3 dB margin would be allowed to transmit at half power, and terminals with 6 dB margin would be allowed to transmit at 25% of full power. If three channels are allocated per cell, the back-off factors assigned may be 1.0 for channel 1, 0.5 for channel 2, and 0.25 for channel three. In a 3-cell reuse pattern, the channels may be staggered so that each cell is allocated the same three channels but with a different set of back-off factors. Table 5 lists the staggered channel assignment for this simple example.

TABLE 5

| Channel, n | Cell 1 | Cell 2 | Cell 3 |
|---|---|---|---|
| 1 | 1.00 | 0.25 | 0.50 |
| 2 | 0.50 | 1.00 | 0.25 |
| 3 | 0.25 | 0.50 | 1.00 |

An actual system typically does not fit the idealized system model described above. For example, non-uniform distribution of terminals, non-uniform base station placement, varied terrain and morphology, and so on, all contribute to variations in the interference levels observed in each cell. The characterization of the cells and the normalization of performance in the cells is typically more complicated than that described above (i.e., the C/I CDFs for the cells are not likely to be identical). Furthermore, the terminals in each cell typically see different levels of interference from the terminals in other cells. Thus, more computations may be required to normalize the effective margins to within a particular threshold level across the cells in the system.

The back-off factors derived for each cell may thus be different and may not be modulo shifted versions of the back-off factors other cells in the reuse cluster. Moreover, different setpoints for the cells and/or channels may also be used to achieve a level of normalized performance, if so desired. The setpoints may also be altered to achieve non-uniform system performance. The effect of different C/I CDFs on the back-off factors and the adjustment of the back-off factors to improve system performance are described in U.S. patent application Ser. No. 09/539,157, entitled "METHOD AND APPARATUS FOR CONTROLLING TRANSMISSIONS OF A COMMUNICATIONS SYSTEM," filed Mar. 30, 2000, assigned to the assignee of the present application and incorporated herein by reference.

A number of different schemes may be used to determine the back-off factors for the cells. In one scheme, a procedure to determine the back-off factors is iterated a number of times, and the back-off factors are adjusted in each iteration such that the maximum achievable setpoint for all channels is met. In an embodiment, the worst-case other-cell interference is assumed in determining the initial back-off factors. In another embodiment, other values may be used instead of the worst-case interference levels. For example, the average, median, or 95-percentile of the other-cell interference distribution may be used to determine the initial back-off factors. In yet another embodiment, the interference levels are adaptively estimated, and the back-off factors periodically adjusted to reflect the estimated interference levels. The back-off factors employed by each cell may or may not be communicated to neighboring cells.

In some embodiments, a subset of the allocated channels in a cell may be provided with some form of "protection". The protection may be achieved, for example, by reserving one or more channels on a periodic basis for exclusive use by terminals in the cell. The exclusivity may also be defined to be exercisable only when required, and only to the extent required to satisfy disadvantaged terminals. The protected channels may be identified to neighbor cells by various means. For example, a cell may communicate to its neighboring cells a list of channels that are protected. The neighbor cells may then reduce or prevent data transmission on the protected channels by terminals in their coverage areas. Channel protection may be used to serve disadvantaged terminals that cannot achieve the required C/I because of excessive interference from the terminals in neighbor cells. For these cases, the channel protection may be removed once the disadvantaged terminals are served.

In some embodiments, a cell may impose "blocking" (i.e., no transmission by terminals within its coverage areas) on certain channels if the channel conditions deteriorate to an unacceptable level (e.g., if the FER is above a certain percentage, or the outage probability exceeds a particular threshold value). Each cell can measure the performance of the channels and self-impose blocking on poor performing channels until there is reasonable certainty that the channel conditions have improved and that reliable communication may be achieved.

The channel protection and blocking may be performed dynamically and/or adaptively based on, for example, the conditions of the cell.

Adjustment to the Default Back-Off Factors

In embodiments that employ power back-off, the back-off factors are computed and provided to the cells in the system. Thereafter, each cell applies the back-off factors when scheduling terminals for data transmission on the uplink and assigning channels to the terminals.

In an aspect, the initial back-off factors may be adjusted dynamically and/or adaptively based on, for example, changes in system loading, terminal characteristics, user demands, performance requirements, and so on. The back-off factors may be adjusted using numerous schemes, some of which are described below.

In one back-off adjustment scheme, the back-off factor(s) of offending cell(s) are reduced during the period of time a disadvantaged terminal is actively communicating. As noted above, the disadvantaged terminal in many instances is not able to achieve the desired setpoint because of excessive interference from a limited number of terminals in other cells.

If the disadvantaged terminal is unable to achieve the desired setpoint even when assigned to the best available channel (a condition referred to as "soft-blocking"), terminals in other cells that cause the interference may have their transmit power temporarily reduced such that the disadvantaged terminal will be able to attain the desired setpoint. As an example, if the primary interference source for a disadvantaged terminal in cell 1 is a terminal in cell 2, then the transmit power of the terminal in cell 2 may be backed-off by an amount necessary to allow the disadvantaged terminal to operate at the desired setpoint (e.g., an additional 3 dB, from $\beta(n)=x$ down to $\beta(n)=0.5x$).

In the above example, if the back-off factor is applied to the terminal in cell 2, then this terminal may no longer be able to meet its setpoint either, potentially causing further reductions in the back-off factors of other cells. Therefore, adjustments may also be made to the setpoints employed in the specified channels of the offending cells in addition to the back-off factors. In addition, these adjustments may be made locally as well, so that the setpoints of both cell 1 and 2 are reduced, e.g., to values that effectively maximize their collective throughput while still meeting the outage criteria of the terminals in both cells.

In another back-off adjustment scheme, the offending cell(s) may be temporarily prevented from using a particular channel so that the disadvantaged terminal may be served. The back-off factor(s) $\beta(n)$ for the effected channel(s) may be set to 0.0 for the offending cell(s).

The primary interference for a particular terminal may be co-channel interference from another terminal in a cell in another reuse cluster. To reduce co-channel interference, the back-off factors for the offending cell may be modified, e.g., shifted so that the back-off factor is not high for the channel experiencing high level of interference.

In another back-off adjustment scheme, one or more channels may be reserved for exclusive use by each cell in the reuse pattern. Other cells in the reuse pattern are then prevented (i.e., blocked) from transmitting on these channels. The number of reserved channels may be based on the load or system requirements, and may be adjusted dynamically and/or adaptively as the operating condition changes. Also, the cells may be allocated different number of reserved channels, again depending on the system design and conditions.

The amount of power back-off to request from other cells may be obtained in various manners. In some implementations, each cell knows the back-off factors necessary to allow disadvantaged terminals to operate at the desired setpoint. The back-off factors may be pre-computed and saved or may be determined from prior transmissions. When a disadvantaged terminal becomes active, the cell knows the back-off factor(s) needed for the terminal and communicate this to the offending cell(s).

For the embodiments in which it is desired to adjust (e.g., reduce or block) the transmit power of the terminals in the offending cells, the cell requesting the back-off adjustment can convey to the offending cells the desired adjustment to the back-off factors to satisfy the requirements of the disadvantaged terminals. The adjustments may also be sent to other cells in the system, which may then use the information to improve the performance of these cells. The offending cells would then apply the requested back-off factors, based on a defined back-off adjustment scheme. Such adjustment scheme may define, for example, the time and duration for which to apply the adjustment. If an offending cell receives back-off requests from a number of other cells, the offending cell typically applies the maximum of the back-off factors that it receives from the requesting cells.

The request (or directive) to temporarily reduce or block the transmission in other cells may be communicated to the offending cells such that the disadvantage terminals can be served. The request may be communicated dynamically to the offending cells as needed, or in an orderly manner (e.g., every few frames), or by some other methods. For example, each cell may send its neighbor cells a list of such requests at the start of each transmission frame with the expectation that the requests would be applied at the next transmission frame. Other methods for communicating requests to other cells may be contemplated and are within the scope of the present invention.

The back-off adjustment may be achieved using numerous methods. In one method, the back-off factors are sent to the neighbor cells on a dynamic basis and are applied shortly thereafter (e.g., the next frame). In another method, the back-off factors are applied at predetermined time, which is known by the affected cells.

Restoration of a back-off factor to its original value may also be achieved using numerous methods. In one method, the original back-off factor can be restored by issuing a "restore" command to the offending cell(s). In another method, the back-off factor is gradually restores to its original value by increasing it incrementally.

In yet another method for back-off adjustment, each cell maintains a known step size for adjusting the back-off factor in each channel. Each cell maintains the current value of the back-off factor employed for each channel and a step size for increasing and decreasing the back-off factor. Thereafter, the cell adjusts the back-off factor in accordance with the associated step size each time it receives a request to reduce transmit power.

In an embodiment, each channel of a particular cell may be associated with maximum and minimum limits on the back-off factor. As an example, assume that a scheduler operating in each cell schedules on common frame boundaries, i=1, 2, 3 . . . Further, let $\beta_m^{max}(n)$ and $\beta_m^{min}(n)$ be the maximum and minimum values for the back-off factor for channel n in cell m, and let $\delta^{up}(n)$ and $\delta^{down}(n)$ represent the step sizes for increasing and decreasing the back-off factor for channel n. The back-off adjustment at frame i in cell m for channel n can then be expressed as:

(a) if any neighbor cells send decrease power commands at frame i:

$\beta_m(n,i)=\max[\beta_m^{min}(n),\beta_m(n,i-1)\cdot\delta^{down}(n)]$, (b) otherwise:

$\beta_m(n,i)=\min[\beta_m^{max}(n),\beta_m(n,i-1)\cdot\delta^{up}(n)]$.

The maximum and minimum back-off limits may also be adjusted as desired or necessary. For example, the maximum and minimum limits can be adjusted based on system loading or requirements.

Dynamic adjustment of the back-off factors may be equated to dynamic adjustment of the system setpoint or the maximum permitted data rate for the channels, based on loading, performance, or some other measures. As the system loading increases, the setpoint may be adjusted (i.e., decreased) to a level that permits reliable operation in the channels. Generally, the setpoint for each channel may also be made adaptive. This allows the data rates associated with the channels to be set differently as desired or necessary. Adaptation of the setpoint in each channel may be performed locally by each cell.

Dynamic adjustment of the back-off factors may be extended such that the back-off factors for all channels in every cell can be dynamically adjusted. This feature allows the system to effectively adjust the power level in each of the channels so that the active terminals in the specified channels are able to meet the desired setpoint. The powers in the channels of adjacent cells can thus become a function of, for example, a group of active terminals in the local cell, their requirements, and so on. If the mix of terminals in a cell is such that all can achieve their setpoints in their assigned channels, then the default back-off factors are employed. Otherwise, additional reductions in the back-off factors (i.e., reduced transmit power) are applied temporarily in the offending neighbor cells in the specified channels and for the specified duration.

When the back-off factors are allowed to be changed dynamically, a scheduler in a particular cell may not be certain of the power being transmitted by the neighbor cells. This can result in an ambiguity in the actual operating points for the terminals in the local cell. Nevertheless, adjustments to the back-off factors can still be performed dynamically, for example, by basing the adjustments on the observed performance of the affected channel.

For example, in one implementation, the cell monitors the average frame-erasure-rate (FER) associated with a terminal in a specific channel. If the actual C/I is lower than the setpoint, there is a higher probability that a frame erasure will occur, thereby resulting in a retransmission of the error frame. The cell can then (1) reduce the data rate for the terminal, (2) request the terminals in the offending cell(s) to reduce their transmit power on this channel, or do both (1) and (2).

Parameters used for Scheduling and Channel Assignment

The adaptive reuse schemes provide a structure for allocating resources to terminals requesting to transmit data on the uplink. During normal system operation, requests to transmit data are received from various terminals throughout the system. The cells then schedule terminals for data transmission and assign channels to the terminals such that high efficiency and performance are achieved.

The scheduling of terminals for data transmission and the assignment of channels to the terminals may be achieved using various scheduling schemes and based on a number of factors. Such factors may include (1) one or more channel metrics, (2) the priority assigned to active terminals, and (3) criteria related to fairness. Other factors (some of which are described below) may also be taken into account in scheduling terminals and assigning channels and are within the scope of the invention.

One or more channel metrics may be used to schedule terminals and/or assign channels such that more efficient use of the system resources and improved performance may both be achieved. Such channel metrics may include metrics based on throughput, interference, outage probability, or some other measures. An example of a channel metric indicative of "goodness" is described below. However, it will be recognized that other channel metrics may also be formulated and are within the scope of the invention.

The channel metrics may be based on various factors such as (1) a terminal's path loss and peak transmit power to the serving cell, (2) other-cell interference characterization, (3) the back-off factors, and possibly other factors. In an embodiment, a channel metric, $d_m(n,k)$, for active terminals may be defined as follows:

$$d_m(n,k)=f\{\beta_m(n)\cdot P_{max}(k)\cdot \zeta_m(k)/I_m(n)\}, \qquad \text{Eq(3)}$$

where:
$\beta_m(n)$ is the back-off factor associated with channel n of cell m, with $0\leq\beta\leq 1$ (when $\beta_m(n)=0$, this is equivalent to preventing cell m from using channel n;);
$P_{max}(k)$ is the maximum transmit power for terminal k;
$\zeta_m(k)$ is the path loss from terminal k to cell m;
$I_m(n)$ is the interference power observed by cell m on channel n; and
f(x) is a function that describes the "goodness" of the argument x, where x is proportional to the C/I.

The exact computation of the other-cell interference, $I_m(n)$, requires the knowledge of the path losses from each interfering terminal (i.e., those assigned to the same channel n) to its serving cell as well as to cell m under consideration. The path loss to the serving cell determines the amount of power to be transmitted by this interfering terminal, if power control is used. And the path loss to cell m determines the amount of transmit power from the interfering terminal will be received at cell m as interference. Direct computation of the other-cell interference, $I_m(n)$, is typically not practical since information about the interfering terminals is normally not available (e.g., these terminals are being scheduled and assigned by other cells at the approximately same time) and the path loss characterization for these terminals is typically not accurate (e.g., likely based on averages and may not reflect fading).

The other-cell interference, $I_m(n)$, may thus be estimated based on various schemes. In one interference estimation scheme, each cell maintains a histogram of the received interference power for each channel. The total receive power, $I_{o,m}(n)$, at cell m for channel n comprises the power, $C_k(n)$, received for the scheduled terminal k in channel n and the interference power received from other interfering terminals in other cells (plus thermal and other background noise). Thus, the other-cell interference may be estimated as:

$$\hat{I}_m(n)=I_{o,m}(n)-C_k(n), \qquad \text{Eq(4)}$$

where $\hat{I}_m(n)$ is the estimated other-cell interference for cell m in channel n. The other-cell interference, $\hat{I}_m(n)$, may be estimated for each channel and at each scheduling interval to form a distribution of the other-cell interference for each channel. An average value, worst case, or some percentile of this distribution may then be used as the other-cell interference $I_m(n)$ in equation (3).

Various functions f(x) may be used for the channel metric. In one embodiment, the channel metric $d_m(n,k)$ represents the outage probability for terminal k in cell m in channel n. In another embodiment, the channel metric $d_m(n,k)$ represents the maximum data rate that may be reliably sustained at the C/I=x. Other functions may also be used for the channel metric and are within the scope of the invention.

The channel metric $d_m(n,k)$ represents a "score" for terminal k in cell m on channel n. The channel metric may be used to schedule terminals for data transmission or to assign channels to terminals, or both. In scheduling terminals and/or assigning channels, a score may be computed for each active terminal for each channel in the cell. For each terminal, the (up to $N_c$) scores are indicative of the expected performance associated with the channels available for assignment. For a particular terminal, the channel having the "best" score may be the best channel to assign to the terminal. For example, if the channel metric $d_m(n,k)$ represents the outage probability, then the channel with the lowest outage probability is the best channel to assign to the terminal.

The channel metric $d_m(n,k)$ may be computed to a degree of confidence based on estimates of the parameters that comprise the function $f(x)$ (e.g., the path loss from terminal k to cell m, the interfering power $I_m(n)$ observed by cell m, and so on). The value of $d_m(n,k)$ may be averaged over a time period to improve accuracy. Fluctuations in the value of $d_m(n,k)$ are likely to occur due to small signal fading of both signal and interference, changes in the location of interference source causing changes in the interference power, and perhaps occasional shadow (e.g., a truck blocking the main signal path). To account for the fluctuations, channels with larger back-off factors may be selected to provide some margins, and the data rates may also be adapted based on changes in the operating conditions.

In an aspect, terminals may be scheduled for data transmission and assigned channels based on their priority such that higher priority terminals are generally served before lower priority terminals. Prioritization typically results in a simpler terminal scheduling and channel assignment process and may also be used to ensure certain level of fairness among terminals, as described below. The terminals in each cell may be prioritized based on a number of criteria such as, for example, the average throughput, the delays experienced by the terminals, and so on. Some of these criteria are discussed below.

In one terminal prioritization scheme, terminals are prioritized based on their average throughput. In this scheme, a "score" is maintained for each active terminal to be scheduled for data transmission. A cell can maintain the scores for the active terminals it services (i.e., for a distributed control scheme) or a central controller can maintain the scores for all active terminals (i.e., in a centralized control scheme). The active status of a terminal may be established at higher layers of the communication system.

In an embodiment, a score $\phi_k(i)$ indicative of an average throughput is maintained for each active terminal. In one implementation, the score $\phi_k(i)$ for terminal k at frame i is computed as an exponential average throughput, and can be expressed as:

$$\phi_k(i) = \alpha_1 \cdot \phi_k(i-1) + \alpha_0 \cdot r_k(i)/r_{max}. \qquad Eq(5)$$

where
$\phi_k(i) = 0$ for $i<0$,
$r_k(i)$ is the data rate for terminal k at frame i (in unit of bits/frame), and
$\alpha_0$ and $\alpha_1$ are time constants for the exponential averaging. Typically, $r_k(i)$ is bounded by a particular maximum achievable data rate, $r_{max}$, and a particular minimum data rate (e.g., zero). A larger value for $\alpha_1$ (relative to $\alpha_0$) corresponds to a longer averaging time constant. For example, if $\alpha_0$ and $\alpha_1$ are both 0.5, then the current data rate $r_k(i)$ is given equal weight as the score $\phi_k(i-1)$ from the prior scheduling interval. The scores $\phi_k(i)$ are approximately proportional to the normalized average throughput of the terminals.

The data rate $r_k(i)$ may be a "realizable" (i.e., "potential") data rate for terminal k based on the achieved (i.e., measured) or achievable (i.e., estimated) C/I for this terminal. The data rate for terminal k can be expressed as:

$$r_k(i) = c_k \cdot \log_2(1 + C/I_k), \qquad Eq(6)$$

where $c_k$ is a positive constant that reflects the fraction of the theoretical capacity achieved by the coding and modulation scheme selected for terminal k. The data rate $r_k(i)$ may also be the actual data rate to be assigned in the current scheduling period, or some other quantifiable data rates. The use of the realizable data rate introduces a "shuffling" effect during the channel assignment process, which may improve the performance of some disadvantaged terminals, as described below.

In another implementation, the score $\phi_k(i)$ for terminal k at frame i is computed as a linear average throughput achieved over some time interval, and can be expressed as:

$$\phi_k(i) = \frac{1}{K} \sum_{j=i-K+1}^{i} r_k(j)/r_{max}. \qquad Eq(7)$$

The average (realizable or actual) throughput of the terminal can be computed over a particular number of frames (e.g., over the latest 10 frames) and used as the score. Other formulations for the score $\phi_k(i)$ for active terminals can be contemplated and are within the scope of the present invention.

In an embodiment, when a terminal desires to transmit data (i.e., becomes active), it is added to a list and its score is initialized (e.g., to zero or a normalized data rate that the terminal can achieve based on the current C/I). The score for each active terminal in the list is subsequently updated in each frame. Whenever an active terminal is not scheduled for transmission in a frame, its data rate is set to zero (i.e., $r_k(i)=0$) and its score is updated accordingly. If a frame is received in error by a terminal, the effective data rate for that frame is also set to zero. The frame error may not be known immediately (e.g., due to round trip delay of an acknowledgment/negative acknowledgment (Ack/Nak) scheme used for the data transmission) but the score can be adjusted accordingly once this information is available.

A scheduler can then use the scores to prioritize terminals for scheduling and/or channel assignment. In a specific embodiment, the set of active terminals is prioritized such that the terminal with the lowest score is assigned the highest priority, and the terminal with the highest score is assigned the lowest priority. The scheduling processor may also assign non-uniform weighting factors to the terminal scores in performing the prioritization. Such non-uniform weighting factors can take into account others factors (such as those described below) to be considered in determining terminal priorities.

In certain embodiments (e.g., if the realizable data rate is used), the score $\phi_k(i)$ for a particular terminal is not necessarily indicative of what is supportable by the terminal (i.e., may not reflect the terminal's potential data rate). For example, two terminals may be assigned the same data rate, even though one terminal may be capable of supporting a higher data rate than the other. In this case, the terminal with the higher potential data rate can be given a higher score and thus will have a lower priority.

The priority of a terminal may also be made a function various other factors. These factors may include, for example, payload requirements, the achievable C/I and the required setpoint, the delays experienced by the terminals, outage probability, interference to adjacent cells, interference from other cells, data rates, the maximum transmit powers, the type of data to be transmitted, the type of data services being offered, and so on. The above is not an exhaustive list. Other factors may also be contemplated and are within the scope of the invention.

A terminal's payload may be used to determine priority. A large payload typically requires a high data rate that may be supported by a smaller number of the available channels. In contrast, a small payload can typically be supported by more of the available channels. The small payload may be assigned to a channel having a large back-off factor that may not be able to support a high data rate needed for a large payload. Since it is more difficult to schedule data transmission for a large payload, a terminal with the large payload can be assigned a higher priority. In this way, the terminal with the large payload may be able to enjoy comparable level of performance as a terminal with a small payload.

A terminal's achieved C/I may also be used to determine priority. A terminal having a lower achieved C/I can only support a lower data rate. If the available resources are used for transmission to a terminal having a higher achieved C/I, the average system throughput would likely increase, thereby improving the efficiency of the system. Generally, it is more preferable to transmit to terminals having higher achieved C/I.

The amount of delay already experienced by a terminal may also be considered in determining priority. If resource allocation is achieved based on priority, a low priority terminal is more likely to experience longer delays. To ensure a minimum level of service, the priority of the terminal can be upgraded as the amount of delay experienced by the terminal increases. The upgrade prevents a low priority terminal from being delayed for an intolerable amount of time or possibly indefinitely.

The type of data to be transmitted by a terminal may also be considered in determining priority. Some data types are time sensitive and require quick attention. Other data types can tolerate longer delay in transmission. Higher priority may be assigned to data that is time critical. As an example, data being retransmitted may be given higher priority than data transmitted for the first time. The retransmitted data typically corresponds to data previously transmitted and received in error. Since other signal processing at the cell may be dependent on the data received in error, the retransmitted data may be given higher priority.

The type of data services being provided may be considered in assigning terminal priority. Higher priority may be assigned to premium services (e.g., those charged higher prices). A pricing structure may be established for different data transmission services. Through the pricing structure, the terminal can determine, individually, the priority and the type of service the terminal can expect to enjoy.

The factors described above and other factors may be weighted and combined to derive the priorities of the terminals. Different weighting schemes may be used depending on the set of system goals being optimized. As an example, to optimize the average throughput of the cell, greater weight may be given to the terminals' achievable C/I. Other weighting schemes may also be used and are within the scope of the invention.

A fairness criterion may be imposed in scheduling terminals and assigning channels to ensure (or maybe even guarantee) a minimum grade of service (GOS). The fairness criterion is typically applied to all terminals in the system, although a particular subset of the terminals (e.g., premium terminals) may also be selected for application of the fairness criterion. Fairness may be achieved with the use of priority. For example, a terminal may be moved up in priority each time it is not scheduled for data transmission and/or with each unsuccessful transmission.

For the terminal prioritization scheme described above, the allocation of resources may be made on the basis of the ratio of scores. In this case, the scores of all active terminals may be referenced to the maximum of the terminal scores to form a modified score $\hat{\phi}_n(k)$, which can be expressed as:

$$\hat{\phi}_k(i) = \phi_k(i) \Big/ \max_k \{\phi_k(i)\}. \qquad \text{Eq (8)}$$

The resources allocated to a particular terminal may then be based on their modified score. For example, if terminal 1 has a score that is twice that of terminal 2, then the scheduling processor can allocate a channel (or a number of channels) having the capacity necessary to equalize the data rates of these two terminals (provided that such channel(s) are available). As a fairness consideration, the scheduler can attempt to normalize data rates at each scheduling interval. Other fairness criteria may also be imposed and are within the scope of the invention.

Scheduling of Data Transmissions

The cells in the system operate using an adaptive reuse plan formulated in the manner described above and in accordance with the prescribed rules and conditions. During normal operation, each cell receives requests from a number of terminals in the cell for data transmission. The cells then schedule terminals for data transmission to meet the system goals. The scheduling can be performed at each cell (i.e., for a distributed scheduling scheme), by a central scheduler (i.e., for a centralized scheduling scheme), or by a hybrid scheme in which some of the cells schedule their own transmissions and a central scheduler schedules transmissions for a set of cells.

Figure 6:
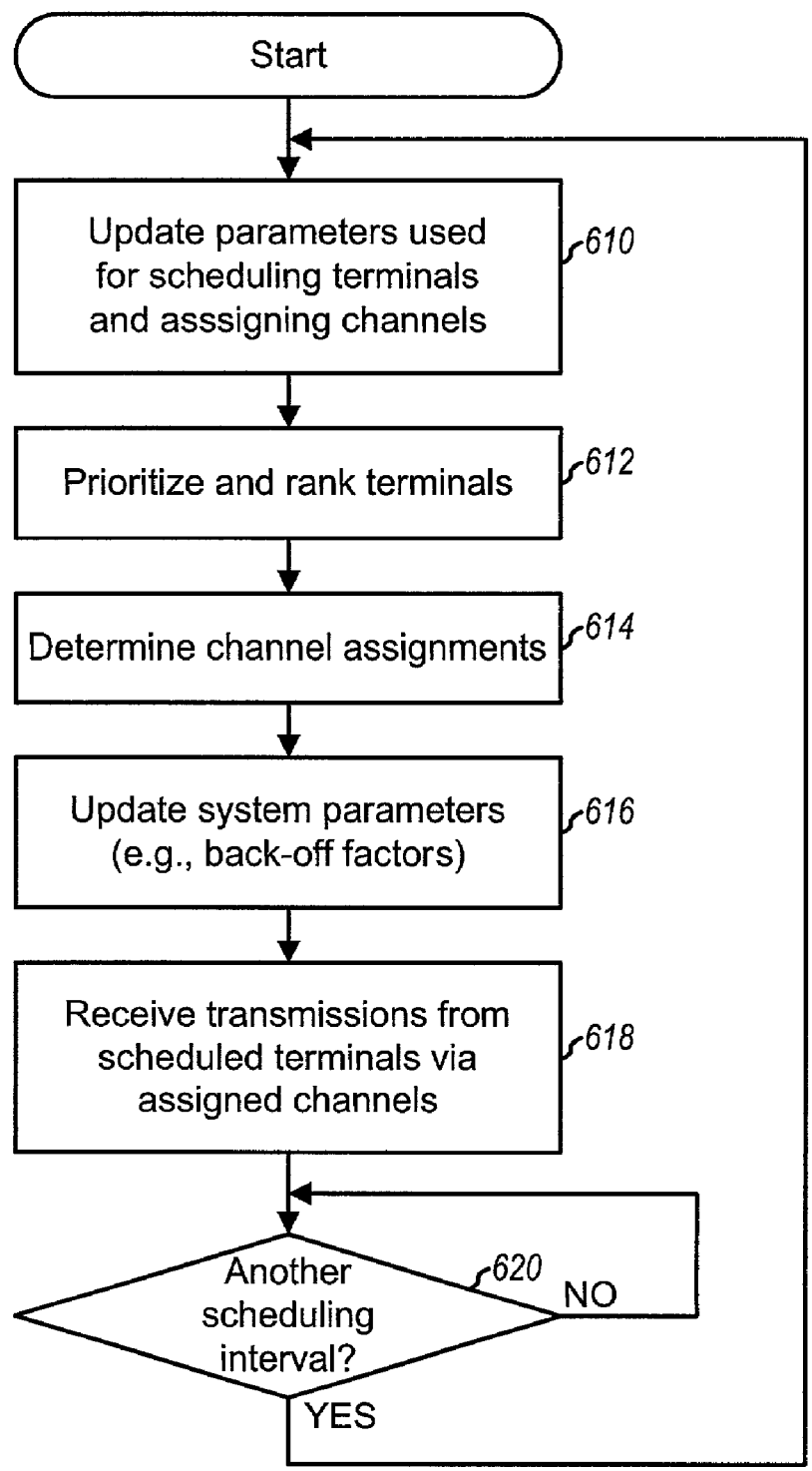
FIG. 6 is a flow diagram of an embodiment of a scheme to schedule data transmissions.

FIG. 6 is a flow diagram of an embodiment of a priority-based scheduling scheme to schedule terminals for data transmission. In this priority-based scheduling scheme, active terminals are scheduled for transmission based on their priority, one terminal at a time, from the highest priority to lowest priority. The number of terminals that may be scheduled for data transmission at each scheduling interval is limited by the number of available channels. For example, up to $N_c$ terminals per cell may be scheduled for transmission on the $N_c$ available channels.

Initially, parameters to be used for scheduling terminals are updated, at step 610. These parameters may include the back-off factors, the other-cell interference characterization, the path losses for the terminals, and possibly others. The parameters may be used to determine the channel metrics for the terminals.

The terminals are then prioritized and ranked, at step 612. Generally, only active terminals having data to transmit are considered for scheduling, and these terminals are prioritized and ranked. Prioritization of terminals may be performed using any one of a number of terminal-rating schemes and may be based on one or more criteria listed above such as the average throughput, payload, and so on. The active terminals are then ranked accordingly based on their priorities, from highest priority to lowest priority.

The available channels are then assigned to the active terminals, at step 614. The channel assignment typically involves a number of steps. First, one or more channel metrics are computed for each terminal for each available channel based on the updated parameters. Any number of channel metrics may be used, such as the one shown in equation (3). The terminals are then assigned to the available channels based on their priority, the computed channel metrics, and possibly other factors such as demand requirements. The channel assignment may be performed based on various channel assignment schemes, some of which are described below.

A channel assignment can imply a channel assigned as well as a data rate to be used. Each of the possible data rates may be associated with a respective coding and modulation scheme. Each scheduled terminal may know (e.g., a priori) the proper coding and modulation scheme to be used based on the assigned data rate. Alternatively, the coding and modulation scheme may be conveyed to the scheduled terminal. This "adaptive" coding and modulation may be used to provide improved performance.

System parameters are then updated to reflect the channel assignments, at step 616. The system parameters to be updated may include, for example, adjustments to the back-off factors for the channels in the cell based on (1) the channel assignments for the scheduled terminals in this cell, (2) requests for adjustment of back-off factors from other cells, and so on. The cell may also request adjustments of the back-off factors by neighbor cells.

The cell then receives data transmissions from the scheduled terminals via the assigned channels, at step 618. From the received transmissions, the cell estimates various quantities that may be used for a future scheduling interval, such as the interference for each channel. Generally, steps 610 through 618 are performed during normal operation of the cell. At step 620, a determination is made whether another scheduling interval has occurred. If the answer is yes, the process returns to step 610 and the terminals are scheduled for the next scheduling interval. Otherwise, the process waits at step 620. Some of these steps are described in further detail below.

Channel Assignment Schemes

The available channels may be assigned to active terminals based on various schemes and taking into account various factors. These channel assignment schemes can range in complexity and in the optimality (i.e., quality) of the assignment results. A few channel assignment schemes are described below for illustration, and these include (1) a priority-based channel assignment scheme, (2) a demand-based channel assignment scheme, and (3) a channel assignment with upgrade scheme. Other schemes can also be implemented and are within the scope of the invention.

In a priority-based channel assignment scheme, channel assignment is performed for one terminal at a time, with the highest priority terminal being considered first for channel assignment and the lowest priority terminal being considered last for channel assignment. All active terminals in the cell are initially prioritized based on a number of factors such as those described above.

Figure 7:
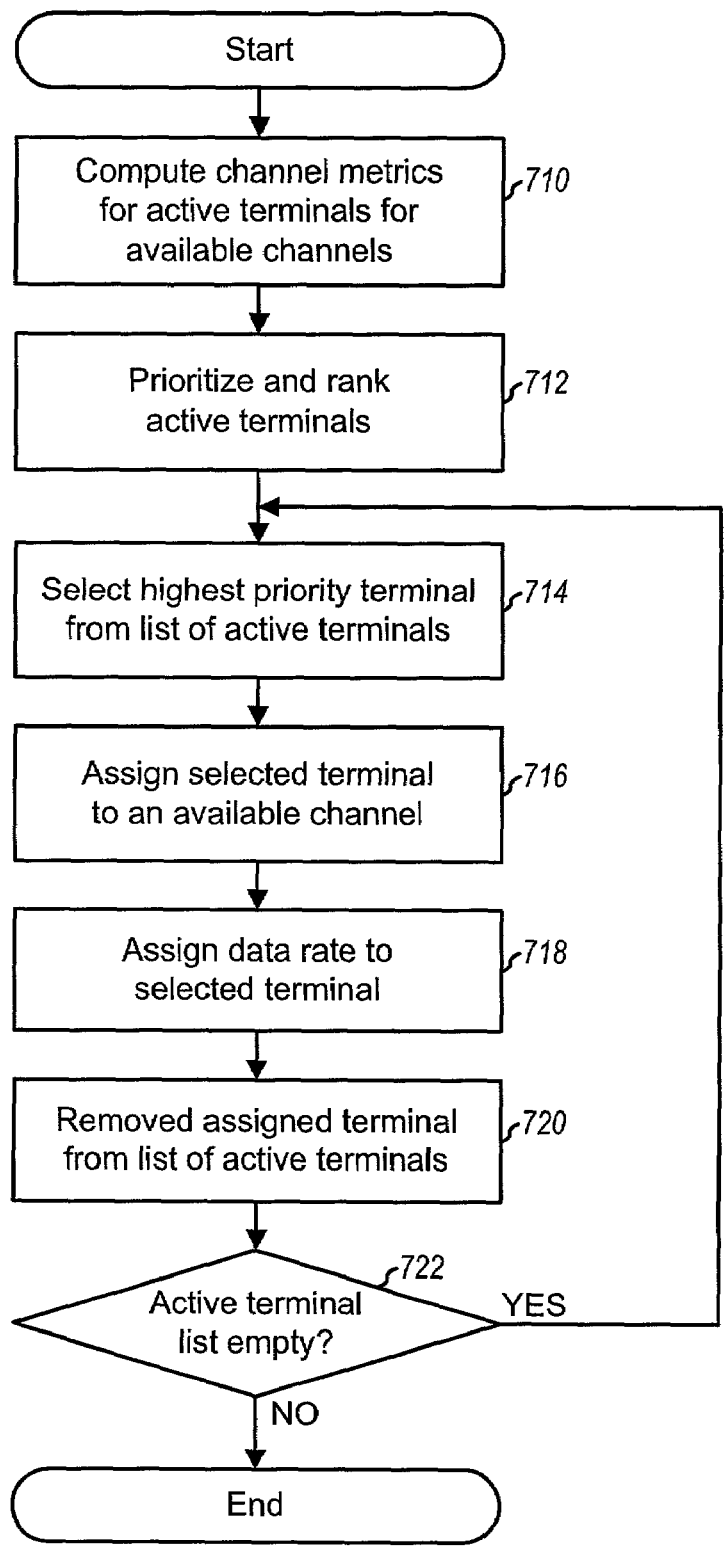
FIG. 7 is a flow diagram of an embodiment of a priority-based channel assignment scheme.

FIG. 7 is a flow diagram of an embodiment of a priority-based channel assignment scheme. Initially, channel metrics are computed for the active terminals and for the available channels, at step 710. Various channel metrics may be used, such at those described above. The active terminals are then prioritized and ranked based on the factors described above, at step 712. The prioritization may also be based on the computed metrics computed in step 710. The terminal priority and channel metrics are then used to perform channel assignment.

At step 714, the highest priority terminal is selected from the list of active terminals, and is assigned an available channel, at step 716. In one embodiment, the selected terminal is given the first choice of channel and is assigned an available channel with the best channel metric. In another embodiment, the selected terminal is assigned an available channel with the worst metric that still meets the terminal's requirements. The selected terminal is also assigned a particular data rate determined based on (1) the maximum rate required by the terminal, (2) the terminal's available transmit power and the back-off factor associated with the assigned channel, and (3) the terminal's requirements (e.g., outage criterion), at step 718.

The assigned terminal is then removed from the list of active terminals, at step 720. A determination is then made whether the active terminal list is empty, indicating that all active terminals have been assigned channels, at step 722. If the list is not empty, the process returns to step 714 and the highest priority, unassigned terminal in the list is selected for channel assignment. Otherwise, if all terminals have been assigned channels, the process terminates.

In an embodiment, if there is a tie during the channel assignment (i.e., if more than one channels are associated with the same or similar channel metrics), the channels are not assigned immediately. Instead, those channels that resulted in the tie are tagged and the evaluation of other lower priority terminals continues. If the next terminal has its largest metric associated with any one of the tagged channels, then that channel may be assigned to that terminal and removed from the list of available channels. When the list of tagged channels for a particular terminal is reduced to one, the remaining channel is assigned to the highest priority terminal that tagged that channel.

If the channel assignments result in a terminal having additional link margin over that required for the assigned data rate (i.e., the C/I of the terminal on the assigned channel is greater than the setpoint), then (1) the data rate of the terminal may be increased to a level that satisfies the required level of performance, or (2) the transmit power of the terminal may be reduced (e.g., by lowering the back-off factor) by up to the amount of the link margin to reduce interference in the system. The increased data rate of the terminal, as supported by the effective link margin, increases the throughput for the terminal as well as the system. Power control is thus effectively exercised for the scheduled terminal. The adjustment in data rate and/or back-off factor may be made for each scheduled terminal based on its channel assignment.

If a terminal is assigned a channel not capable of supporting the desired data rate, several options may be applied. In one option, the terminal is scheduled to transmit at a reduced data rate (a condition referred to herein as "dimming"). In another option, the terminal is not permitted to transmit in the current scheduling interval (a condition referred to herein as "blanking"), and the channel is made available to another active terminal. In either case, the priority of a terminal that is dimmed or blanked may be increased, improving the terminal's chances for earlier consideration in the next scheduling interval.

If the priority of a terminal is updated according to its average throughput, then the channel assignment scheme may consider the terminal's achievable data rate when assigning channel. In one embodiment, the particular channel assigned to a terminal is the one that maximizes the terminal's throughput at a given outage level. The channel assignment scheme can first evaluate the best channel for the terminal from the list of available channels. The maximum data rate that satisfies the required outage criteria is then assigned to the terminal for that channel.

In a demand-based channel assignment scheme, the demand or payload requirements of the terminals are considered when making channel assignments such that the available system resources may be better utilized. For a particular set of available channels, a terminal having lower payload requirements (which may be satisfied with a lower data rate) may be serviced by a number of available channels whereas a terminal having higher payload requirements (which may require a higher data rate) may be serviced by a reduced number of available channels. If the terminal with the lower payload requirements has higher priority and is assigned the best available channel (among many channels that also fulfill the terminal's requirements), and if that channel is the only one that can fulfill the requirements of the terminal with the higher payload, then only one terminal will be served and the resources are not effectively used.

As an example, consider a situation where three channels are available for assignment to two terminals and that terminal 1 has a payload requirement of 1 Kbyte and terminal 2 has a payload requirement of 10 Kbytes. Further, assume that only one of the three channels will satisfy the requirement of terminal 2 whereas all three channels will satisfy the requirement of terminal 1. The channels may be assigned as follows:

(a) If terminal 2 has higher priority than terminal 1, terminal 2 is assigned the channel that maximizes its throughput. Terminal 1 is then assigned the next best channel by default. Both terminals are served by their channel assignments.

(b) If terminal 1 has higher priority than terminal 2, and if the payload requirements of the terminals are not considered in making the channel assignment, terminal 1 may be assigned the channel that has the largest effective margin even though any one of the available channels would have satisfied terminal 1's requirement. Terminal 2 would be assigned the next best channel by default, which may not satisfy its requirement. Terminal 2 would then be served at a lower data rate or remain in the queue until the next scheduling period.

Several assignment options are available for case (b). If the channel assignment is performed as described above, the power used in the channel assigned to terminal 1 can be reduced to the level required for reliable communications at the desired data rate. Another assignment option in case (b) is to assign terminal 1 the channel having the lowest margin that satisfies the requirements of terminal 1. With this channel assignment, other better channels are made available for other terminals that may need them (e.g., because of higher payload requirements or lower achieved C/I). Using this demand or payload-based channel assignment, channels with larger margins are available for assignment to subsequent terminals that may require the additional margins. Payload-based channel assignment may thus maximize the effective throughput in a scheduling interval.

A flow diagram for the demand-based channel assignment scheme may be implemented similar to that shown for the priority-based channel assignment scheme in FIG. 7. In one embodiment, each terminal selected for channel assignment is assigned an available channel with the worst metric that still meets the terminal's requirements. In another embodiment, the priorities of the terminals may be modified such that terminals with larger payloads are considered for assignment earlier. Numerous other variations are also possible and are within the scope of the invention.

In a channel assignment with upgrade scheme, the active terminals are initially assigned channels (e.g., based on their priorities or demands as described above) and thereafter upgraded to better channels if any are available. In certain embodiments of the schemes described above, higher priority terminals may be initially assigned to the worst channels that still satisfy their requirements, and better channels are saved for lower priority terminals in case they are needed. These schemes may result in successively lower priority terminals being assigned to successively better channels associated with back-off factors that are closer to unity (i.e., greater transmit power).

If the number of active terminals is less than the number of available channels, it is possible to upgrade the terminals. A terminal may be upgraded to another unassigned channel that has a higher margin than the initial assigned channel. The reason for upgrading the terminal is to increase reliability and/or lower the effective transmit power required to support the transmission. That is, since a number of unassigned channels satisfies the terminal's requirements, reassigning the terminal to the channel with higher margin allows for reduction in the transmit power by the amount of margin.

Various schemes may be used to upgrade channels, some of which are described below. Other channel upgrade schemes may also be implemented and are within the scope of the invention.

In one channel upgrade scheme, terminals are reassigned to better available channels, if these channels meet the requirements of the terminals and can provide larger link margins. The channel upgrade may be performed based on priority such that higher priority terminal are upgraded first and lower priority terminals are upgraded later if channels are available. This upgrade scheme allows some or all of the active terminals to enjoy better channels having higher link margins.

Figure 8:
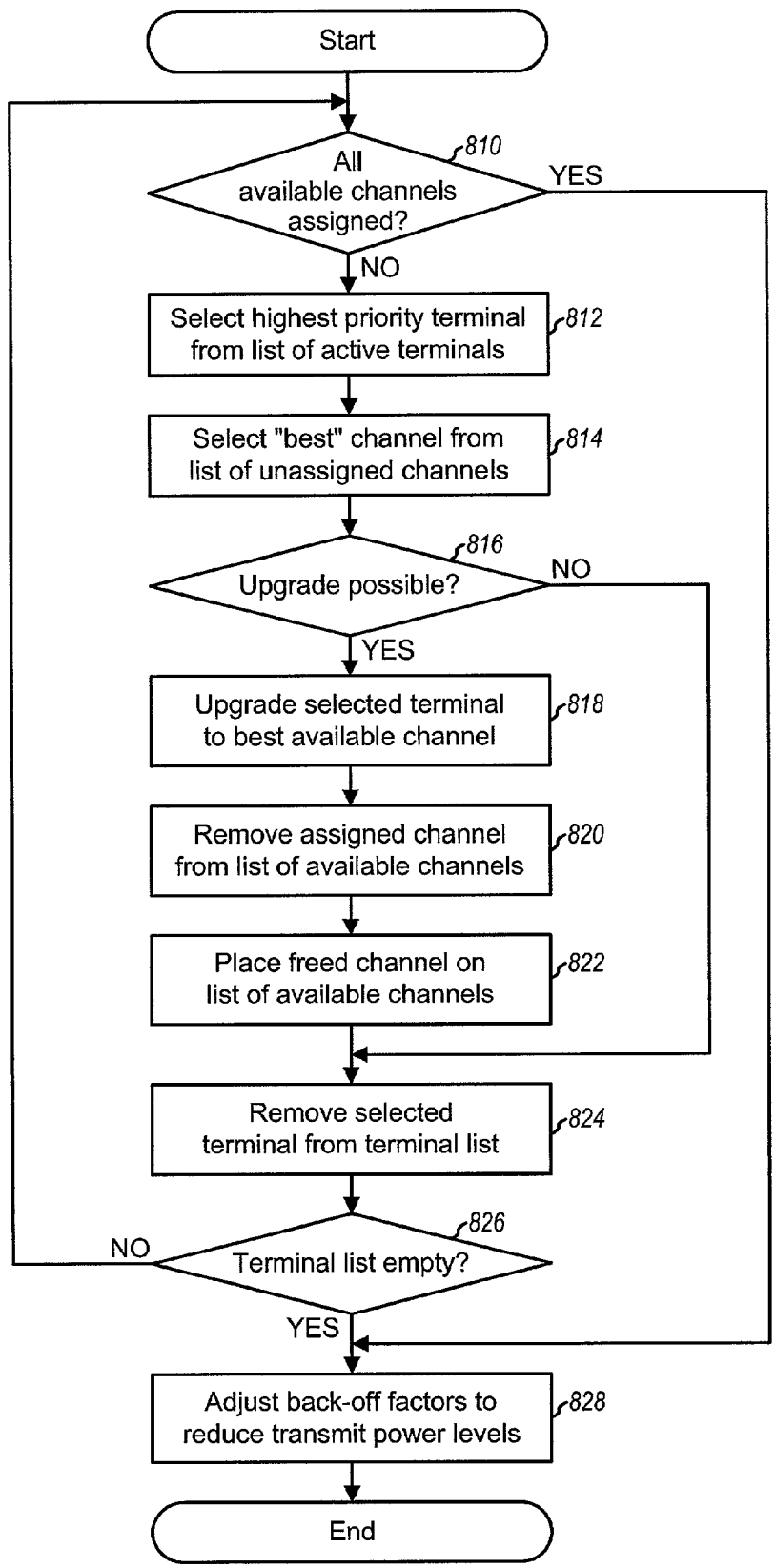
FIG. 8 is a flow diagram of an embodiment of a channel upgrade scheme.

FIG. 8 is a flow diagram of an embodiment of a channel upgrade scheme whereby terminals are upgraded based on their priorities. Prior to commencing the upgrade process shown in FIG. 8, the active terminals are assigned to their initial channel assignments, which can be achieved using the channel assignment scheme described above in FIG. 7. At step 810, a determination is made whether all available channels have been assigned to active terminals. If all channels have been assigned, no channels are available for upgrade and the process proceeds to step 828. Otherwise, the terminals are upgraded to the available channels, if these channels are better (i.e., associated with better channel metrics) than the original assigned channels.

At step 812, the highest priority terminal from the list of active terminals is selected for possible channel upgrade. For the selected terminal, the "best" channel from the list of unassigned channels is selected. The best channel may correspond to the channel having the "best" channel metric for the selected terminal.

A determination is then made whether an upgrade is possible for the selected terminal, at step 816. If the channel metric of the best available channel is worse than that of the channel originally assigned to the selected terminal, then no upgrade is performed and the process proceeds to step 824. Otherwise, the selected terminal is upgraded to the best available channel, at step 818, which is then removed from the list of available channels, at step 820. The channel initially assigned to the selected terminal may be placed back on the list of available channels for possible assignment to some other lower priority terminal, at step 822. The selected terminal is then removed from the list of active terminals, at step 824, regardless of whether a channel upgrade was performed or not.

At step 826, a determination is made whether the list of active terminals is empty. If the terminal list is not empty, the process returns to step 810 and the highest priority in the list is selected for possible channel upgrade. Otherwise, if no channels are available for upgrade or if all active terminals have been considered, the process proceeds to step 828 and the back-off factors for all channels are adjusted to reduce the transmit powers of the scheduled and assigned terminals. The process then terminates.

The upgrade process in FIG. 8 effectively upgrades active terminals to the available channels that are more likely to provide improved performance. The channel upgrade scheme shown in FIG. 8 may be modified to provide improved channel upgrades. For example, for a particular terminal, it may be possible that a channel freed up by a lower priority terminal is better for this terminal. However, the terminal is not assigned to this channel because it has already been removed from the terminal list by the time the lower priority terminal is considered. The process in FIG. 8 may thus be iterated a number of times, or other tests may be performed to account for this situation.

In another channel upgrade scheme, the assigned terminals are upgraded by the number of available channels. For example, if three channels are available, each scheduled and assigned terminals move up by three slots. This upgrade scheme allows most (if not all) terminals to enjoy better channels. For example, if channels 1 through 12 having progressively worse performance are available for assignments and nine terminals are initially assigned to channels 4 through 12, then each terminal may be upgraded by three channels. The nine terminals then occupy channels 1 through 9 and channels 10 through 12 may be disabled.

In another channel assignment scheme, the differences between the channel metrics associated with the channels may be taken into account in the channel assignment. In some instances, it may be better to not assign the highest priority terminal the channel with the best channel metric. For example, a number of channels may be associated with approximately similar metrics for a particular terminal, or a number of channels may provide the required C/I. In these instances, the terminal may be assigned one of several channels and still be properly served. If a lower priority terminal has as its best channel the same one selected by a higher priority terminal, and if there is a large disparity between the lower priority terminal's best and second best channels, then it may be more optimal to assign the higher priority terminal its second best channel and assign the lower priority terminal its best channel. For example, if terminal 1 has similar channel metrics for channels 2 and 3 and the next lower priority terminal 2 has a much larger channel metric for channel 3 than channel 2, then terminal 1 may be assigned channel 2 and terminal 2 may be assigned channel 3.

In yet another channel assignment scheme, the highest priority terminal tags the available channels that provide the required performance (similar to the tagging of tied channels described above). The next lower priority terminal then tags its acceptable channels. The channel assignment is then performed such that lower priority terminals are assigned channels first but channels needed by higher priority terminals are reserved.

In yet another channel assignment scheme, the channels are more optimally assigned to active terminals in the cell by considering a large number of permutations of channel assignments over the group of active terminals in the cell. In this case, the channel assignment decision for a particular terminal is not made on the basis of the terminal's metrics and priority alone. In an implementation, the terminal's priority can be converted into a weight that is used to scale the metrics in the computation of the channel assignments in the cell.

Active terminals may be scheduled for transmission and assigned channels based on their priorities, demand, scores (e.g., as computed in equation (3)), and so on, as described above. Some other considerations for scheduling terminals for data transmission and assigning channels are described below.

First, a particular terminal may be assigned to multiple channels if such channels are available and if one channel is not capable of meeting the terminal's requirements. For example, a terminal may be assigned a first channel capable of supporting 50% of the terminal's requirements, a second channel capable of supporting 35% of the terminal's requirements, and a third channel capable of supporting the remaining 15% of the terminal's requirements. If this particular allocation of resources prevents other terminals from achieving their requirements, then the priorities of the underserved terminals may improve such that they will be considered earlier for the allocation of resources in subsequent scheduling intervals.

Second, a particular terminal may be assigned to different channels for different scheduling intervals to provide a "shuffling" effect. This shuffling of assigned channels may provide interference averaging in certain instances, which may improve the performance of a disadvantaged terminal.

Third, the probabilities of other terminals transmitting on a particular channel can be taken into account. If a number of channels have nearly equal channel metrics without taking into account the occupancy probabilities, then the better channel to assign is the one that has the lowest probability of being used. Thus, the probability of channel occupancy may be used to determine the best channel assignment.

Fourth, excessive outage probability may be considered in making the channel assignments. In some instances, it is possible that assignment of a channel to a particular terminal is unwarranted or unwise. For example, if a terminal's expected outage probability for a particular channel is excessive, there may be a reasonable likelihood that the entire transmission on that channel will be corrupted and would need to be re-transmitted. Furthermore, assignment of the channel may increase the likelihood that transmissions by terminals in adjacent cells are also corrupted by the additional interference. In such instances, assignment of the channel to the terminal may be unwise, and it may be better to not assign the channel at all or to assign the channel to another terminal that may make better use of it.

The available channels may also be assigned to terminals with zero or more conditions or constraints on usage. Such conditions may include, for example (1) limitation on the data rate, (2) maximum transmit power, (3) restriction on the setpoint, and so on.

A maximum data rate may be imposed on a channel assigned to an active terminal. For example, if the expected C/I is not able to support the required data rate, then the data rate may be reduced to achieve the requirement.

Maximum transmit power constraints may be placed on certain assigned channels. If the cells in the system have knowledge of the power constraints for the channels in other cells, then the interference levels may be computed locally with higher degree of certainty and better planning and scheduling may be possible.

A particular setpoint may be imposed on an assigned channel, for example, in heavily loaded situations. A (e.g., low priority) terminal may be assigned a channel that does not meet the required minimum outage probability (i.e., the assigned channel has an expected C/I that is lower than required). In this case, the terminal may be required to operate using the assigned channel at a lower setpoint that satisfies the required performance criteria. The setpoint employed may be static or adjustable with system loading. Also, the setpoint may be imposed on a per channel basis.

Control Schemes

The adaptive reuse schemes, the scheduling of terminals for data transmission, and the assignment of channels may be implemented in various manners and using numerous control schemes such as centralized, distributed, and hybrid control schemes. Some of these control schemes are described below.

In a centralized control scheme, information from the active terminals in all cells to be commonly controlled is provided to a central processor that processes the information, schedules data transmissions, and assigns channels based on the received information and a set of system goals. In a distributed control scheme, information from the active terminals in each cell is provided to a cell processor that processes the information, schedules data transmissions, and assigns channel for that cell based on the information received from the terminals in that cell and possibly other information received from other cells.

A distributed control scheme performs scheduling of terminals for data transmission and channel assignment at the local level. The distributed control scheme may be implemented at each cell and involved coordination between cells is not required.

In the distributed control scheme, local information may be shared dynamically with other cells in the system even though the scheduling and channel assignment may be performed locally at each cell. The shared information may include, for example, the loading at a particular cell, a list of active terminals at the cell, channel availability information, the assigned back-off factors, and so on. In the distributed control scheme, this information need not be shared in a dynamic manner and may be "stautic" information available to the cells in the system. The shared information can be used by the cells to help decide how to best allocate resources locally.

The distributed control scheme may be advantageously used under both low and high load conditions, and is simpler to implement than the centralized control scheme. At low load, the terminals in the cells are more likely to be able to transmit using orthogonal channels, which results in minimal interference to terminals in other cells. As the load increases, the interference levels in the system will generally increase and there is a higher likelihood that the terminals will be assigned to non-orthogonal channels. However, as the load increases, the group of terminals the cell can select from for scheduling also increases. Some of these terminals may be more tolerant of other-cell interference than others. A distributed control scheme exploits this fact scheduling terminals and assigning channels.

Distributed, centralized, and hybrid scheduling schemes are described in further detail in U.S. Pat. No. 5,923,650, entitled "METHOD AND APPARATUS FOR REVERSE LINK RATE SCHEDULING," issued Jul. 13, 1999, U.S. Pat. No. 5,914,950, also entitled "METHOD AND APPARATUS FOR REVERSE LINK RATE SCHEDULING," issued Jun. 22, 1999, and U.S. patent application Ser. No. 08/798,951, entitled "METHOD AND APPARATUS FOR FORWARD LINK RATE SCHEDULING," filed Sep. 17, 1999, all assigned to the assignee of the present invention and incorporated herein by reference.

Power Control

Power control may be exercised by the cells for the assigned channels. If a terminal is assigned a channel and has positive link margin (i.e., the difference between the expected C/I and the setpoint is positive), the transmit power of the terminal may be reduced based on the determined link margin. Even if other cells in the system are not aware of the reduced back-off for a particular channel, the overall effect is to reduce interference levels and improve the probability of successful transmission. Power control may be performed dynamically, possibly in similar manner as that performed for the uplink power control in CDMA systems.

Combination with Other Reuse Structures

The adaptive reuse schemes described herein may also be implemented within or in combination with other reuse structures. One such structure is disclosed by T. K. Fong et al. in a paper entitled "Radio Resource Allocation in Fixed Broadband Wireless Networks," IEEE Transactions on Communications, Vol. 46, No. 6, June 1998, which is incorporated herein by reference. This reference describes partitioning each cell into a number of sectors and transmitting to each sector at designated (and possibly non-designated) and staggered time slots selected to reduce the amount of interference.

Another reuse structure is disclosed by K. K. Leung et al. in a paper entitled "Dynamic Allocation of Downlink and Uplink Resource for Broadband Services in Fixed Wireless Networks," IEEE Journal on Selected Areas in Communications, Vol. 17, No. 5, May 1999, which are incorporated herein by reference. This reference describes partitioning each cell into a number of sectors and transmitting to each sector at designated (and possibly non-designated) and staggered time slots and sub-time slots selected to reduce the amount of interference. The C/I of the terminals are determined, and terminals are classified into groups based on their tolerance for up to q concurrent transmissions. The transmission pattern is then selected and data transmissions are scheduled to ensure conformance with the requirements of the terminals.

Yet another reuse structure is disclosed by K. C. Chawla et al. in a paper entitled "Quasi-Static Resource Allocation with Interference Avoidance for Fixed Wireless Systems," IEEE Journal on Selected Areas in Communications, Vol. 17, No. 3, March 1999, which is incorporated herein by reference. This reference describes assigning each cell with a "beam-off" sequence and allowing the terminals to inform the cell the best time slots for its data transmissions.

System Design

Figure 9:
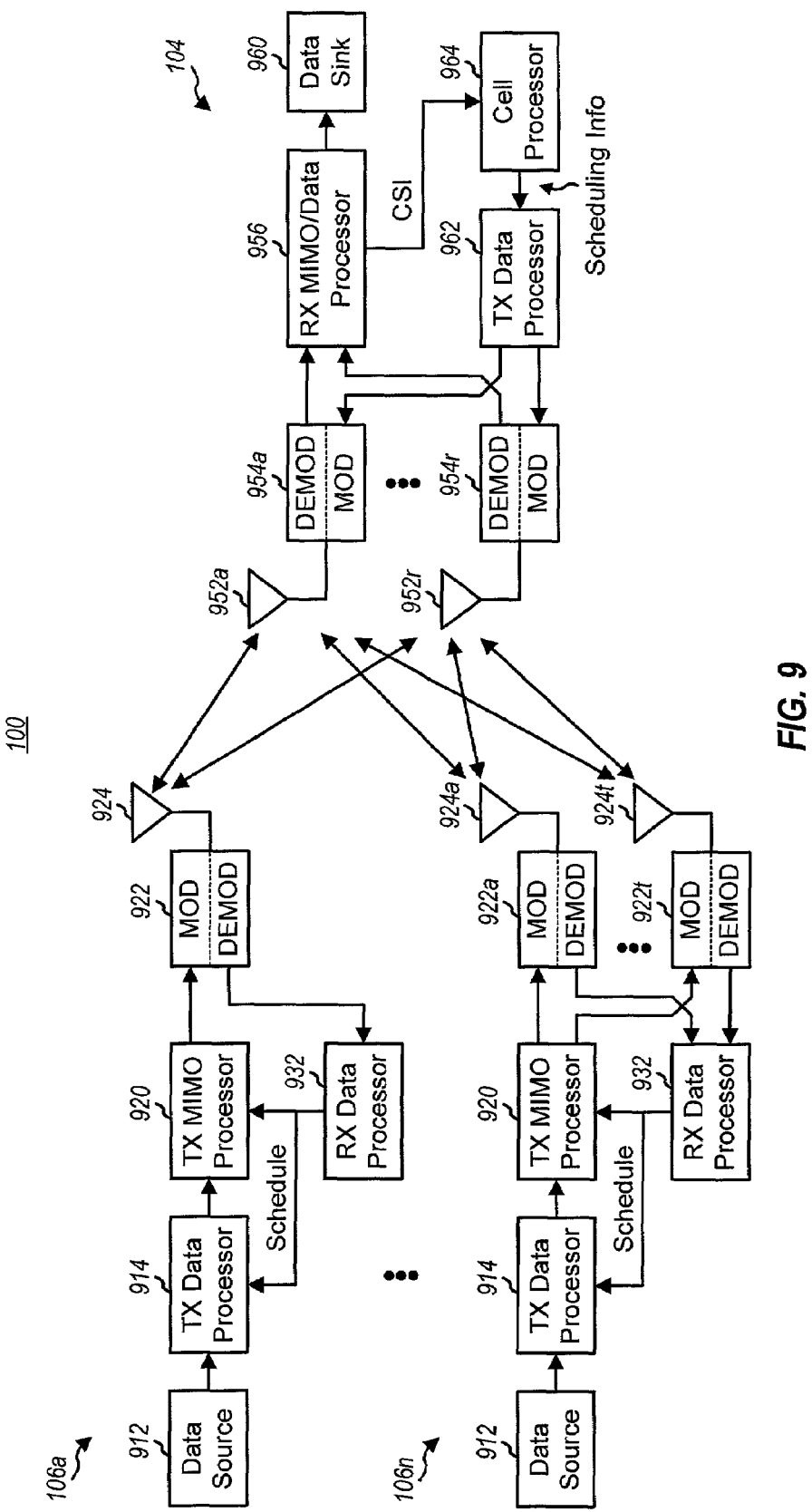
FIG. 9 is a block diagram of a base station and terminals in a communication system, which are capable of implementing various aspects and embodiments of the invention.

FIG. 9 is a block diagram of base station 104 and terminals 106 in communication system 100, which is capable of implementing various aspects and embodiments of the invention. At each scheduled terminal 106, a data source 912 provides data (i.e., information bits) to a transmit (TX) data processor 914. TX data processor 914 encodes the data in accordance with a particular encoding scheme, interleaves (i.e., reorders) the encoded data based on a particular interleaving scheme, and maps the interleaved bits into modulation symbols for one or more channels assigned to the terminal for data transmission. The encoding increases the reliability of the data transmission. The interleaving provides time diversity for the coded bits, permits the data to be transmitted based on an average C/I for the assigned channels, combats fading, and further removes correlation between coded bits used to form each modulation symbol. The interleaving may further provide frequency diversity if the coded bits are transmitted over multiple frequency subchannels. In an aspect, the coding and symbol mapping may be performed based on information provided by the base station.

The encoding, interleaving, and signal mapping may be achieved based on various schemes. Some such schemes are described in U.S. patent application Ser. No. 09/532,492, entitled "HIGH EFFICIENCY, HIGH PERFORMANCE COMMUNICATIONS SYSTEM EMPLOYING MULTI-CARRIER MODULATION," filed Mar. 22, 2000, U.S. patent application Ser. No. 09/826,481, entitled "METHOD AND APPARATUS FOR UTILIZING CHANNEL STATE INFORMATION IN A WIRELESS COMMUNICATION SYSTEM," filed Mar. 23, 2001, and U.S. patent application Ser. No. 09/776,075, entitled "CODING SCHEME FOR A WIRELESS COMMUNICATION," filed Feb. 1, 2001, all assigned to the assignee of the present application and incorporated herein by reference.

A TX MIMO processor 920 receives and demultiplexes the modulation symbols from TX data processor 914 and provides a stream of modulation symbols for each transmission channel (e.g., each transmit antenna), one modulation symbol per time slot. TX MIMO processor 920 may further precondition the modulation symbols for each assigned channel if full channel state information (CSI) is available (e.g., a channel response matrix H). MIMO and full-CSI processing is described in the aforementioned U.S. patent application Ser. No. 09/532,492.

If OFDM is not employed, TX MIMO processor 920 provides a stream of modulation symbols for each antenna used for data transmission. And if OFDM is employed, TX MIMO processor 920 provides a stream of modulation symbol vectors for each antenna used for data transmission. And if full-CSI processing is performed, TX MIMO processor 920 provides a stream of preconditioned modulation symbols or preconditioned modulation symbol vectors for each antenna used for data transmission. Each stream is then received and modulated by a respective modulator (MOD) 922 and transmitted via an associated antenna 924.

At base station 104, a number of receive antennas 952 receive the signals transmitted by the scheduled terminals, and each receive antenna provides a received signal to a respective demodulator (DEMOD) 954. Each demodulator (or front-end unit) 954 performs processing complementary to that performed at modulator 922. The modulation symbols from all demodulators 954 are then provided to a receive (RX) MIMO/data processor 956 and processed to recover one or more data streams transmitted for the terminal. RX MIMO/data processor 956 performs processing complementary to that performed by TX data processor 914 and TX MIMO processor 920 and provides decoded data to a data sink 960. The processing by base station 104 is described in further detail in the aforementioned U.S. patent application Ser. No. 09/776,075.

RX MIMO/data processor 956 further estimates the link conditions for the active terminals. For example, RX MIMO/data processor 956 may estimate the path loss for each active terminal, the interference on each channel, and so on, which comprise channel state information (CSI). This CSI may be used to develop and adapt the reuse plan and to schedule active terminals and assign channels. Methods for estimating a single transmission channel based on a pilot signal or a data transmission may be found in a number of papers available in the art. One such channel estimation method is described by F. Ling in a paper entitled "Optimal Reception, Performance Bound, and Cutoff-Rate Analysis of References-Assisted Coherent CDMA Communications with Applications," IEEE Transaction On Communication, October 1999.

A cell processor 964 at base station 104 uses the CSI to perform a number of functions including (1) developing and adapting a reuse plan, (2) scheduling the best set of terminals for data transmission, (3) assigning channels to the scheduled terminals, and (4) determining the data rate and possibly the coding and modulation scheme to be used for each assigned channel. Cell processor 964 may schedule terminals to achieve high throughput or based on some other performance criteria or metrics, as described above. For each scheduling interval, cell processor 964 provides a list of terminals scheduled to transmit on the uplink and their assigned channels and (possibly) data rates (i.e., scheduling information). In FIG. 9, cell processor 964 is shown as being implemented within base station 104. In other implementation, the functions performed by cell processor 964 may be implemented within some other element of communication system 100 (e.g., a central controller located in a base station controller that couples to and interacts with a number of base stations).

A TX data processor 962 then receives and processes the scheduling information, and provides processed data to one or more modulators 954. Modulator(s) 954 further condition the processed data and transmit the scheduling information back to terminals 106 via a downlink channel. The scheduling information may be sent to the scheduled terminals by the base station using various signaling techniques, as described in the aforementioned U.S. patent application Ser. No. 09/826,481, For example, the scheduling information may be sent on a designated downlink channel (e.g., a control channel, paging channel, or some other type of channel). Since the active terminals request the base station for data transmission on the uplink, these terminals would know to monitor the designated downlink channel for their schedules, which would identify the times they are scheduled to transmit and their assigned channels and (possibly) data rates.

At terminal 106, the transmitted feedback signal is received by antennas 924, demodulated by demodulators 922, and provided to a RX data/MIMO processor 932. RX data/MIMO processor 932 performs processing complementary to that performed by TX data processor 962 and recovers a schedule, which is then used to direct the processing and transmission of data by the terminal. The schedule determines when and on which channel the terminal is allowed to transmit on the uplink, and typically further identifies the data rate and/or coding and modulation scheme to be used for the data transmission. If the terminal is not provided with information regarding which data rates to use on which channel, then the terminal may use "blind" rate selection and determine the coding and modulation scheme. In this case, the base station may perform blind rate detection to recover the data transmitted by the terminal.

The elements of the base station and terminals may be implemented with one or more digital signal processors (DSP), application specific integrated circuits (ASIC), processors, microprocessors, controllers, microcontrollers, field programmable gate arrays (FPGA), programmable logic devices, other electronic units, or any combination thereof.

Some of the functions and processing described herein may also be implemented with software executed on a processor.

Certain aspects of the invention may be implemented with a combination of software and hardware. For example, the processing to schedule (i.e., select terminals and assign transmit antennas) may be performed based on program codes executed on a processor (e.g., cell processor 964 in FIG. 9).

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for controlling transmissions on an uplink in a communication system, comprising:
    determining one or more characteristics of the communication system;
    partitioning available system resources into a plurality of channels;
    defining a plurality of back-off factors for the plurality of channels based at least in part on the one or more determined characteristics of the communication system, wherein each channel is associated with a respective back-off factor that identifies a reduction from peak transmit power level, and wherein each back-off factor ranges from zero to one; and
    assigning the plurality of channels to terminals for data transmission at power levels determined based at least in part on the plurality of back-off factors, wherein at least one channel is associated with a back-off factor of one, representative of full transmit power, and remaining channels are associated with back-off factors of less than one.

2. The method of claim 1, wherein the one or more determined characteristics include characterization of interference on the plurality of channels.

3. The method of claim 1, wherein the one or more determined characteristics include loading probabilities for the communication system.

4. The method of claim 1, wherein the plurality of back-off factors are defined to approximately match the one or more determined characteristics of the communication system.

5. The method of claim 1, wherein the plurality of back-off factors are defined to approximately match C/I characterization of terminals in the communication system.

6. The method of claim 1, wherein the plurality of back-off factors are defined based in part on one or more setpoints selected for the plurality of channels, wherein each setpoint corresponds to a C/I required for a particular level of performance.

7. The method of claim 6, wherein the one or more setpoints are determined based in part on data rates of data transmissions on the plurality of channels.

8. The method of claim 1, further comprising:
    estimating a link margin for each channel;
    adjusting the plurality of back-off factors based on the estimated link margin.

9. The method of claim 1, further comprising:
    adaptively adjusting the plurality of back-off factors to reflect changes in the communication system.

10. The method of claim 1, further comprising:
    reducing one or more back-off factors for a particular time duration to reduce interference on the associated channels.

11. The method of claim 1, further comprising:
    setting one or more back-off factors to zero for a particular time duration co eliminate interference on one or more associated channels.

12. The method of claim 1, wherein the available system resources are partitioned into a plurality of time division multiplexed (TDM) time slots, and wherein the plurality of channels correspond to defined sets of time slots.

13. The method of claim 1, wherein the available system resources are partitioned into a plurality of frequency division multiplexed (FDM) channels.

14. The method of claim 1, wherein the available system resources are partitioned into a plurality of code division multiplexed (CDM) channels.

15. A method for controlling transmissions on an uplink in a communication system, comprising:
    defining a reuse pattern for the communication system, wherein the reuse pattern includes a plurality of cells;
    determining one or more characteristics for each cell in the communication system;
    partitioning available system resources into a plurality of channels;
    defining a plurality of back-off factors for the plurality of channels for each cell in the communication system based at least in part on the determined one or more characteristics, wherein each channel of each cell is associated with a respective back-off factor that identifies a reduction from peak transmit power level, and wherein each back-off factor ranges from zero to one; and
    assigning the plurality of channels in each cell to terminals within the cell for data transmission at power levels determined based at least in part on the back-off factors associated with the assigned channels, wherein the back-off factors for each cell in the reuse pattern are approximately staggered from those of neighboring cells in the reuse pattern.

16. The method of claim 15, wherein the one or more determined characteristics for each cell include characterization of interference on the plurality of channels in the cell.

17. The method of claim 16, wherein the plurality of back-off factors for each cell are defined based in part on the interference characterization for the cell.

18. The method of claim 15, further comprising:
    adjusting the back-off factors assigned to the channel in each cell to reduce co-channel interference.

19. The method of claim 15, further comprising:
    estimating link margins for the channels in each cell; and
    adjusting the back-off factors for each cell based on the estimated link margins.

20. The method of claim 15, further comprising:
    at a particular cell, receiving one or more requests from one or more neighbor cells to reduce the back-off factor for a particular channel; and
    reducing the back-off factor for the channel in accordance with the one or more received requests.

* * * * *